(12) United States Patent
Trivi et al.

(10) Patent No.: US 8,325,900 B2
(45) Date of Patent: Dec. 4, 2012

(54) TELEPHONE CALL CLASSIFICATION UTILIZING A SOCIAL NETWORK GRAPH

(75) Inventors: Jean-Michel Trivi, Boulder Creek, CA (US); Marco Nelissen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,342

(22) Filed: Sep. 26, 2011

(65) Prior Publication Data

US 2012/0015639 A1 Jan. 19, 2012

Related U.S. Application Data

(63) Continuation of application No. 12/787,565, filed on May 26, 2010.

(51) Int. Cl.
*H04M 3/42* (2006.01)

(52) U.S. Cl. .......... 379/210.03; 709/204; 709/206; 379/201.01; 379/201.02; 379/201.11; 379/210.02; 455/415

(58) Field of Classification Search .......... 455/415; 709/204, 206; 379/201.01, 201.02, 201.11, 379/210.02, 210.03, 211.01
See application file for complete search history.

(56) References Cited

U.S. PATENT DOCUMENTS

| | | | |
|---|---|---|---|
| 7,711,786 B2 | 5/2010 | Zhu et al. | |
| 7,844,671 B1 * | 11/2010 | Lawler et al. | 709/206 |
| 2005/0020289 A1 | 1/2005 | Kim et al. | |
| 2006/0041622 A1 | 2/2006 | Qutub et al. | |
| 2007/0283006 A1 | 12/2007 | Hong | |
| 2008/0155693 A1 | 6/2008 | Mikan et al. | |
| 2009/0282094 A1 | 11/2009 | Hawkins | |

FOREIGN PATENT DOCUMENTS

WO WO 2009/005253 A1 1/2009

OTHER PUBLICATIONS

Balasubramaniyan V. .A et al., "CallRank: Combating SPIT Using Call Duration, Social Networks and Global Reputation," retrieved from the Internet: URL:http://www.ceas.cc/2007/papers/paper-63.pdf, pp. 1-8, XP002565207 (Aug. 3, 2007).

* cited by examiner

*Primary Examiner* — Dwayne Bost
*Assistant Examiner* — Gerald Johnson
(74) *Attorney, Agent, or Firm* — Fish & Richardson P.C.

(57) ABSTRACT

In general, the subject matter described in this specification can be embodied in methods, systems, and program products for identifying telephone spam. An indication of an incoming telephone call and a calling device telephone number for the incoming telephone call is received. An indication that the calling device telephone number has been determined to be a source of telephone spam based on identifications by one or more users, other than a user of a mobile telephone, that the calling device telephone number is a source of telephone spam is received. A secondary alert is output to the user of the mobile telephone that is different than a default alert. The default alert is output to the user of the mobile telephone if the calling device telephone number is not determined to be a source of telephone spam.

26 Claims, 10 Drawing Sheets

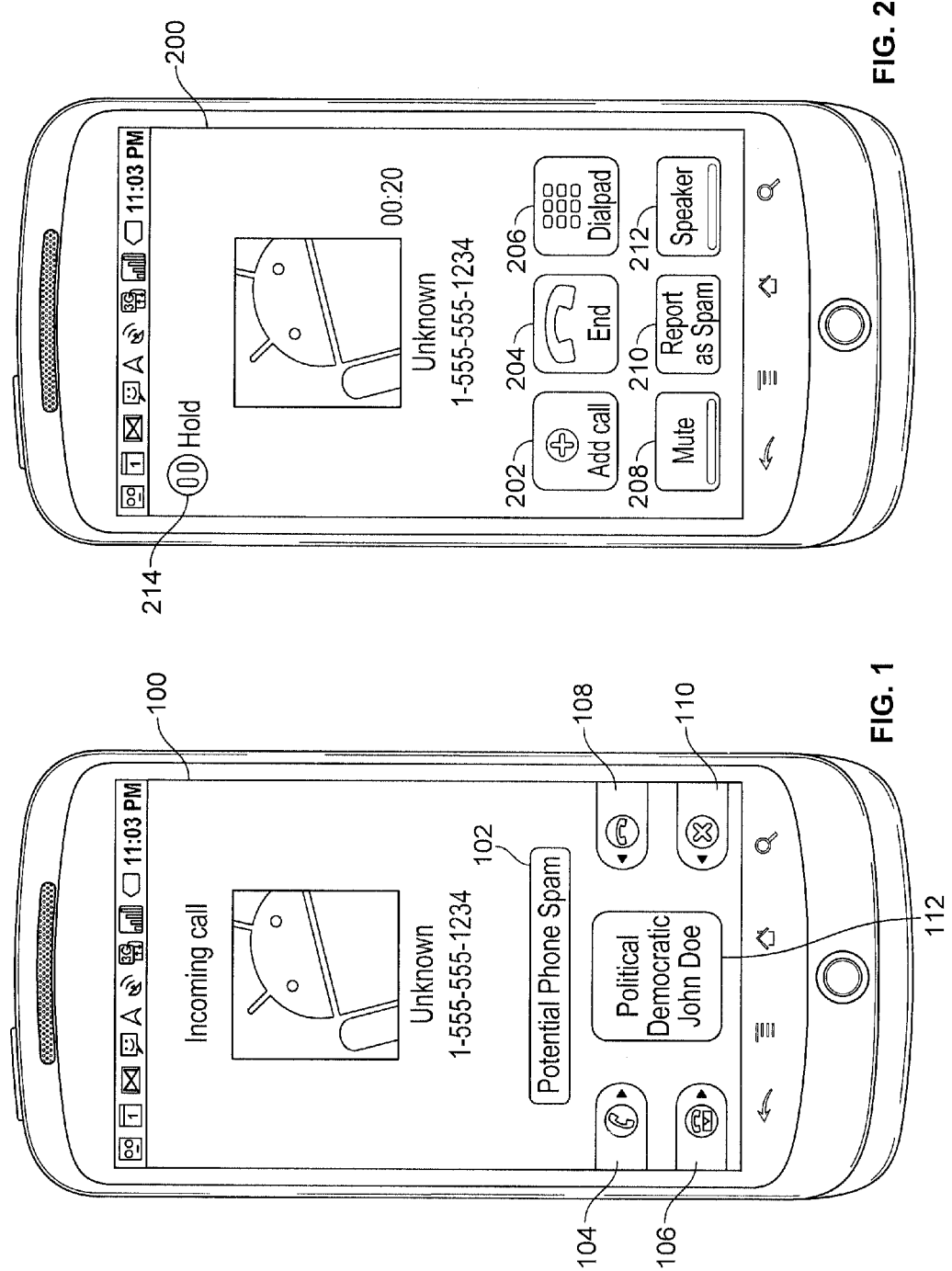

… (1)

TELEPHONE CALL CLASSIFICATION UTILIZING A SOCIAL NETWORK GRAPH

RELATED APPLICATIONS

This application is a continuation application of U.S. Ser. No. 12/787,565, filed on May 26, 2010, which is incorporated herein in its entirety.

TECHNICAL FIELD

This document generally describes techniques, methods, systems, and mechanisms for performing telephone caller classification.

BACKGROUND

The present disclosure generally relates to the classification of telephone callers. Mobile telephones have historically established voice communication links with geographically dispersed base stations as part of a closed voice communication network. Mobile communication network service providers, however, have opened their networks so that the mobile telephones may communicate with computing devices that are accessible via the internet and that are not under the control of the mobile communication network service provider that establishes the voice communication links.

SUMMARY

This document generally describes telephone caller classification, such as to surmise that a caller is a spammer and deal with such a call accordingly. A mobile telephone that receives an incoming telephone call may receive a message from a server system that indicates to the mobile telephone that the incoming telephone call has been identified by other mobile telephone users as a source of undesirable content (e.g., hereinafter referred to as a "spam" telephone call). For example, the incoming telephone call (i) may play pre-recorded messages to devices that answer the incoming telephone call, (ii) may be from telemarketers, or (iii) may be from a debt collection agency. The message from the server system may be presented visually, such as on a screen of the mobile telephone, or audibly, such as in a recorded message telling the user about the presumed nature of the caller, before the call is fully connected.

The mobile telephone may enable a user of the telephone to interact with an incoming spam telephone call differently than they would with a normal incoming telephone call. For example, a user may normally be able to either answer the incoming telephone call or send the incoming telephone call to voicemail. In contrast, a user receiving an incoming spam telephone call may be able to additionally play a pre-recorded message to the caller that does not present the caller with an opportunity to record a message, and may permanently block the caller so that the mobile telephone no longer rings if a call is received from the same telephone number. The mobile telephone may ring differently or provide a different display for a spam call than a call that is not determined to be spam.

Incoming telephone calls are flagged as being spam based on user-submitted spam classifications, where the classifications submitted by certain users can be used to classify calls for other users, a form of social spam identification and detection. For example, users of mobile phones may be able to terminate telephone calls with a spam identification user input that is different than a normal end call user input. In response, a server system may be notified that the telephone calls were perceived as being sources of spam. These spam classifications may be used to determine if a telephone call that is being received at a different mobile telephone—or is to be received at a different mobile telephone—is a spam telephone call.

For example, a calling device telephone number (e.g., identified using automatic number identification, or ANI) may be identified as spam if: (i) the calling device telephone number has been classified as spam greater than a threshold number of times, (ii) a determined proportion of calls from the calling device and to subscribers of the spam classification service have been classified as spam, (iii) users who are closely related to the called mobile device in a social network (e.g., direct friends, friends of friends, or followers) have classified the incoming telephone call as spam, or (iv) the user of the called mobile device has applied tags to calls that he previously classified as spam that are similar to tags that other users have applied to the telephone number that is calling the mobile device.

In general, one aspect of the subject matter described in this specification can be embodied in a computer-implemented method for identifying telephone spam. An indication of an incoming telephone call and a calling device telephone number for the incoming telephone call is received at a mobile telephone. An indication that the calling device telephone number has been determined to be a source of telephone spam based on identifications by one or more users, other than a user of the mobile telephone, that the calling device telephone number is a source of telephone spam is received at the mobile telephone. A secondary alert to the user of the mobile telephone that is different than a default alert is output by the mobile telephone. The default alert is output to the user of the mobile telephone if the calling device telephone number is not determined to be a source of telephone spam.

Another aspect of the subject matter described in this specification can be embodied in a computer-implemented method for identifying telephone spam. Communications from a set of mobile telephones that each classify a telephone number as a source of telephone spam are received at a server system. Each communication from a mobile telephone includes (i) an identification of the telephone number, and (ii) a user-selected tag having a plurality of alphanumeric characters that categorizes a subject matter of audio received during a call from the telephone number. The telephone number for an incoming telephone call to a particular mobile telephone is identified at the server system. The telephone number for the incoming telephone call is determined to be a source of telephone spam by identifying that the telephone number for the incoming telephone call has been classified as a source of telephone spam by the set of mobile telephones. An indication that the telephone number of the incoming telephone call is a source of telephone spam is transmitted to the particular mobile telephone.

In yet another aspect, the subject matter described in this specification can be embodied in a system for identifying telephone spam. The system includes a call handler unit to receive indications of incoming telephone calls for a plurality of mobile telephones and to inform the plurality of mobile telephones of the incoming calls. The system includes a community identification unit to determine a subset of the plurality of mobile telephones that are related to a particular mobile telephone based on a social network distance between a user of the particular mobile telephone and each user of the subset of the plurality of mobile telephones. The system includes a telephone spam classification unit to (i) receive from the plurality of mobile telephones communications that classify calling device telephone numbers as sources of spam, and (ii)

store data that identifies the calling device telephone numbers as telephone numbers that were identified as sources of spam by users of the plurality of mobile telephones. The system includes means for identifying that an incoming telephone call for the user of the particular mobile telephone is a source of spam by accessing, from the stored data that identifies calling device telephone numbers as sources of spam, identifications by users of the subset of the plurality of mobile telephones that the telephone number for the incoming telephone call is spam.

These and other implementations can optionally include one or more of additional aspects. The calling device telephone number can be transmitted to a server system in a request to establish whether the calling device telephone number is a source of telephone spam. Communications from multiple mobile telephones classifying calling device telephone numbers as sources of telephone spam can be received at the server system. The request to establish whether the calling device telephone number is a source of telephone spam can be received at the server system. The calling device telephone number can be determined by the server system to be a source of telephone spam by identifying that the calling device telephone number has been classified as a source of telephone spam by one or more of the multiple mobile telephones. The indication that the calling device telephone number has been determined to be a source of telephone spam can be transmitted to the mobile device.

In yet additional aspects, an indication of a different incoming telephone call can be received at the mobile telephone. User input that answers the different incoming telephone call can be received at the mobile telephone. User input that classifies the different incoming telephone call as a source of telephone spam can be received at the mobile telephone subsequent to the user input that answers the call. The user input that classifies the different incoming telephone call as a source of telephone spam may also terminate the different incoming telephone call. User input that selects a descriptive tag that identifies a type of the source of telephone spam can be received at the mobile telephone subsequent to the user input that answers the call. A communication that (i) classifies the incoming telephone call as a source of telephone spam, and (ii) identifies the selected descriptive tag can be transmitted from the mobile telephone to the server system. The calling device telephone number may be determined to be a source of spam by a server system that used a social network distance between the user of the mobile telephone and the one or more other users in the determination.

In yet additional aspects, outputting the secondary alert may include providing on a display of the mobile telephone an indication that the incoming telephone call is a source of telephone spam while the telephone is in a state that enables the user to answer the telephone with a single-action user input. Outputting the default alert may include not providing on the display the indication that the incoming telephone call is a source of telephone spam. An ability of the user to activate a playing of a pre-recorded message to the calling device without answering the incoming telephone call may be invoked in response to receiving the indication that the calling device telephone number has been determined to be a source of telephone spam. The pre-recorded message may not be played to the calling device without the user-activation. An ability of the user to activate an early termination of the incoming telephone call without answering the incoming telephone call may be invoked in response to receiving the indication that the calling device telephone number has been determined to be a source of telephone spam. The early termination may not occur without the user-activation.

In yet additional aspects, the set of mobile telephones may be selected from a community of mobile telephones that provide communications to the server system that each classify the telephone number as a source of telephone spam. The set of mobile telephones may be selected based on a distance in a social network graph between the particular mobile telephone and each of the telephones in the community. The social network graph distance for each of the telephones in the community may be based on a number of relationships between the particular mobile telephone and the telephone in the set. The social network graph distance for each of the telephones in the community may be further based on a strength of the relationships between the particular mobile telephone and the telephones in the community.

In yet additional aspects, the telephone number of the incoming telephone call to the particular mobile telephone may be received at the server system from the particular mobile telephone in a request to determine if an incoming telephone call that has been received by the particular mobile telephone is a source of telephone spam, the request received prior to a termination of the incoming telephone call with the particular mobile telephone. At least one user-selected tag received in a communication from one or more of the set of mobile telephones that classified the telephone number of the incoming telephone call as a source of telephone spam may be transmitted to the particular mobile telephone. Transmitting the at least one user-selected tag may cause the particular mobile telephone to display the at least one user-selected tag in an interface that is presented to a user of the particular mobile telephone as an indication that an incoming telephone call is being received.

In yet additional aspects, determining that the particular calling device telephone number is a source of telephone spam may include identifying that communications from the one or more of the set of mobile telephones includes a user-selected tag that a user of the particular mobile telephone has previously selected to categorize a subject matter of audio received during a call from a telephone number. The social network distance between the user of the particular mobile telephone and each user of the subset may include a number of relationships between the user of the particular mobile telephone and the users of the subset.

Particular embodiments can be implemented, in certain instances, to realize one or more of the following advantages. A user of a telephone may be able to avoid answering telephone calls that have been flagged by other telephone users as spam, saving time and mobile telephone minutes. A user may have a choice of options for interacting with a telephone call that is received as spam. The user may play a pre-recorded message or block the call permanently. Playing the message may provide the calling user or device information on why the call was terminated. Thus, if the call was flagged as spam in error, the calling user may be able to correct the mistake.

Mobile telephone users may also categorize the incoming telephone calls with textual labels. The labels may be particular to the user, so that one user's welcomed call is another person's spam—for example, a user may choose to have fundraising calls from one political party identified as spam, which may occur when other users gets calls from that party and them identify the calling number with a label that is the name of the party. For other users (i.e., those of the opposite political persuasion), that label may not present a problem. Also, when an incoming telephone call is flagged as spam, the called user may be presented (e.g., on a visual list displayed on the screen of their telephone) with topics defined by other users that classified the calling device telephone number as spam, providing information that may help the called user decide whether or not to answer the telephone (e.g., by looking at the labels and then selecting a control so that their telephone handles the call as spam or not as spam). The user-defined topics may also be used to tailor spam classifications to a particular called user, so that the called user is less likely to receive spam calls that he does not want to, but may receive calls that some other users classified as spam but that the called user does not consider spam.

The determination of whether a call is spam may be based on classifications by users that are closely related to the called user in a social network (and potentially not based on users that are not closely related). Because individuals that are related in a social network may share interests, the spam classifications may be more likely to be relevant to the called user than if spam classifications by all users are considered.

The details of one or more embodiments are set forth in the accompanying drawings and the description below. Other features, objects, and advantages will be apparent from the description and drawings, and from the claims.

DESCRIPTION OF DRAWINGS

FIG. 1 is a mobile telephone displaying an interface that is presented when an incoming telephone call has been identified as spam.

FIG. 2 is a mobile telephone displaying an interface that may be presented when an incoming telephone call has been answered by a user.

Like reference symbols in the various drawings indicate like elements.

DETAILED DESCRIPTION

Figure 4:
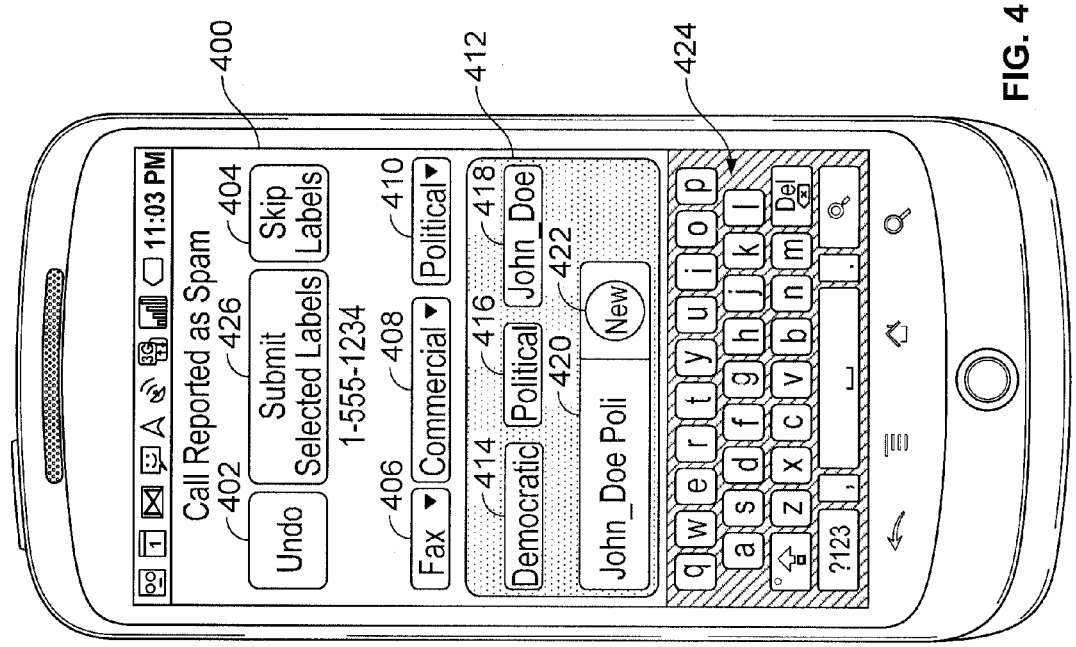
FIG. 4 is a mobile telephone displaying an interface that enables a user to categorize a telephone call that has terminated.

This document describes techniques, methods, systems, and mechanisms for performing telephone caller identification. In general, this document describes mechanisms for a spam identification service to determine that an incoming telephone call that is directed to a mobile telephone is spam (e.g., that the incoming telephone call is a telemarketer or an unsolicited bulk telephone call). For telephone calls that are identified as spam, a user of a mobile telephone may be provided spam-specific options for handling the incoming telephone call. For example, the user may elect to end the call and permanently block all calls from the incoming telephone number, end the call and play a pre-recorded message to the calling telephone, or send the calling device to the user's voicemail. The spam identification service may determine that incoming telephone calls are spam based on electronic messages received from mobile telephones that indicate that users of the mobile telephones provided user-input classifying a received telephone call as spam. For example, a user may answer a call and hit a "Telephone Spam" button to end the call instead of a normal "End Call" button.

As an illustration, a bulk calling computerized system (e.g., a bulk calling service) is configured to call thousands of telephones and play pre-recorded messages when users answer their telephone. The bulk calling system may dial a telephone number that corresponds to Joe's application telephone. Joe's telephone may ring and the telephone's display may indicate that the incoming telephone call is from an unknown telephone number, but may not otherwise indicate that the incoming telephone call is from a bulk calling service (hereinafter referred to generally as "telephone spam"). Although Joe's telephone may be subscribed to a spam identification service, his telephone may be one of the first telephones called upon the bulk calling system being connected to a particular outbound telephone number.

Joe may answer the call so that voice communication is established with the bulk calling system, enabling Joe to hear audio provided by the bulk calling system, and the computerized system to receive audio that the microphone of Joe's application telephone picks up. Upon answering the call, Joe may realize that the call is a pre-recorded message asking Joe to purchase an extended automobile warranty. Joe may wish to terminate the call, but may not press a normal "End Call" button. Instead, Joe may, as a subscriber to the spam identification service, be able to select a "Telephone Spam" button. In response to Joe's selection of the telephone spam button, the mobile telephone may: (i) disconnect the telephone call, (ii) add the telephone number associated with the incoming call to a black list (so that Joe's phone may never again ring if a phone call is received from the incoming telephone number), and (iii) send to the spam identification service a message that indicates that the incoming telephone call was a spam telephone call.

Over a period of days the bulk calling system may call thousands of telephones and some of the users that subscribe to the spam-identification service may press similar "Telephone Spam" buttons. Thus, the spam identification service may maintain a statistical dataset that includes: (i) telephone numbers that have been classified as sources of spam, (ii) devices or user accounts that classified each of the telephone numbers, and (iii) an portion of, or amount of, times that each telephone number was classified as spam. "Subscribers" of the spam identification service may include individuals who are able to report answered telephone calls as spam and receive indications that incoming telephone calls are spam (e.g., users that have their calls routed through the spam-identification service, or users that install software on their mobile telephone that enables the mobile telephone to query the spam-identification service to determine if an incoming telephone call is spam).

After the calling telephone number that is associated with the bulk calling system has been classified as spam a threshold amount (either number or proportion) of times, the spam identification service may prompt those subscribers who receive an incoming telephone call from the bulk calling service that the incoming telephone call is a spam telephone call. An example mechanism for prompting the subscribers includes routing telephone calls that are directed to a particular telephone through the spam identification service's server system so that the spam identification service may intercept the telephone calls before they reach the mobile telephone and may transmit, with an indication of the incoming telephone call, an identification of whether or not the incoming telephone call is spam. Another example mechanism for prompting the subscribers includes configuring the mobile telephones to transmit a spam identification request to a server system when an incoming telephone call is received the mobile telephones.

In this illustration, the bulk calling system dials Mary's mobile telephone after several weeks of operation and after numerous subscribers to the spam-identification service have classified the bulk calling system's telephone number as a source of spam. Mary's telephone, before ringing, may send a request to the spam identification service to determine whether or not the incoming telephone call is spam. The request may include the telephone number of the incoming telephone call. The spam identification service may identify that twenty-four telephones, for example, have classified the telephone number of the incoming call as spam. The spam identification service may determine that this number of spam classifications is above a predetermined threshold of ten classifications, and in response, may transmit to Mary's mobile telephone a communication that indicates that the incoming telephone call is spam.

In response to receiving the indication that the incoming telephone call is spam, Mary's telephone may invoke operations that would not otherwise be invoked if the incoming telephone call were not identified as a spam telephone call. For instance, the alert provided by Mary's telephone may differ. As an example, her telephone may display a graphical interface element that states "Attention: Incoming Telephone Call Potentially Spam." Similarly, the type or volume of audible alert or physical vibration may differ from that for a normal telephone call.

Additionally, Mary's telephone may enable her to interact with calling devices that are identified as spammers. For instance, upon receiving a call that is identified as telephone spam, the touchscreen of Mary's telephone may display an interface element that, when selected by Mary, causes the playing of a pre-recorded telephone message to the calling device (e.g., a message that says "You have been identified as a source of telephone spam, please remove this number from your lists. If this message has been received in error, please contact the AAA spam identification service at 555-555-5590."). As another example, the touchscreen of Mary's telephone may display an interface element to block the calling device. If the interface element is selected, Mary's telephone may stop ringing, and Mary's telephone may no longer ring when an incoming telephone call from the calling device is received at Mary's telephone.

The determination by the spam identification service of whether a particular telephone call is spam may be specific to the device at which the call is to be received. For example, if an incoming telephone call is directed to Mary's telephone, the spam identification service may not determine a global number of spam classifications for the incoming telephone number, but may determine a number of classifications by individuals that are within a pre-determined distance of Mary in a social network graph.

A social network graph may be a data structure or conceptual representation of relationships between subscribers to the spam identification service. Two subscribers may be determined to be related if: (i) one of the individuals is in the other individual's electronic telephone contact book, (ii) one of the individuals has accepted the other individual's request to view their profile in a social network, or (iii) one of the individuals has called or text messaged the other individual during a particular time period. A distance in the social graph may be a number of relationships required to connect users. For example, users within a social graph distance of "1" may include all individuals that are in Mary's contact list. A social graph distance of "2" may also include the individuals that are in each contact list for each person in Mary's contact list (e.g., friends of friends).

Thus, Mary's mobile telephone may be more likely to indicate that an incoming telephone call is spam if individuals closer to her in the social graph have classified the number of the incoming telephone call as spam. In some examples, only classifications that have been provided by users within a threshold distance of Mary (e.g., 3) are counted. In some examples, classifications are provided a weight based on their distance from Mary. The weight may be based on a number of relationships between Mary and the classifying user, and based on a strength of the relationships (e.g., a frequency of calling). The weights of multiple classifications may be combined, and the combination may need to exceed a threshold number for the incoming call to be determined to be spam.

In some examples, user-specific determinations of whether an incoming telephone call is spam are determined based upon a categorization of the incoming telephone call. For example, users may categorize calls that they classify as spam (e.g., by applying "labels" or "tags" to each call that is classified as spam). An incoming telephone call may be more likely to be identified as spam if a categorization of the spam is of a type that the recipient of the incoming telephone call has indicated is undesirable.

Returning to the illustration in which Joe had received a call from a bulk calling system, upon classifying the call as telephone spam, Joe may able to select tags that categorize the type of telephone spam. Joe may select the tags "Bulk Call" and "Auto Warranty." These labels may be supplied to the spam identification service server system and stored in association with the telephone number for the bulk calling system. Other subscribers of the spam identification service may similarly categorize telephone calls that they classify as spam.

The spam identification server system may use labels that are received from the subscribers to identify, for a telephone call that is directed to a mobile telephone, not only that the telephone call is spam, but also a type of spam. As an illustration, if the bulk calling system calls Mary's mobile telephone, her mobile telephone may not only display that the incoming telephone call is spam, but may also display the tags "Bulk Call" and "Auto Warranty."

Also, the spam categorizations may be used to determine whether an incoming telephone call should be flagged as spam for a particular user. The spam identification service may store a list of topics that are to be flagged as spam for a particular user, and the topics in this list may be used to weight whether an incoming telephone call is spam. As an illustration, Mary may have earlier accessed an interface for identifying categories of spam that she is not interested in receiving. Mary may have selected the options "bulk calls" and "political."

Thus, for incoming calls that are directed to Mary's telephone, the spam identification service may only flag as spam those telephone calls that have been: (i) classified as spam by other users, and (ii) categorized "bulk calls" or "political." In some examples, incoming calls that are not categorized as "bulk calls" or "political" may still be flagged for Mary as spam calls, but a greater number of spam classifications may be required to flag such calls. In other words, an incoming call that has been tagged by other users with topics that are not of interest to Mary may be weighted more strongly in a determination of whether the call should be flagged as spam.

The list of categories that the spam identification service identifies as undesirable to Mary may also be compiled based on categories that Mary has selected when classifying incoming calls as spam. For instance, Mary may not mind bulk calls in general, but may not enjoy calls from a particular political party. Thus, if Mary frequently categorizes her spam-classified calls as "Democratic," an incoming telephone call that has been categorized by other users as "Democratic" may be flagged as spam, where an incoming telephone call that has been categorized by other users as "Republication" may not be flagged as spam, or may be less likely to be flagged as spam.

FIG. 1 is a mobile telephone displaying an interface 100 that is presented when an incoming telephone call has been identified as spam. In this example, the calling device telephone number is not in a list of contacts that is accessible to the mobile telephone and thus the text "Unknown" is displayed for the incoming telephone call instead of a name.

The displayed interface 100 includes an interface element 102 that graphically indicates to a user of the mobile telephone that the incoming telephone call has been flagged as telephone spam by a spam identification server system. The interface element 102 may not be selectable and may not otherwise be displayed when the incoming telephone call has not been identified as telephone spam. In various implementations, additional non-interactive text or graphical interface elements are displayed to visually indicate to the user of the mobile telephone that the incoming telephone call is potentially spam. For example, the background color may be different. Also, auditory sounds and tactile sensations may be unique to incoming telephone calls that have been identified as spam. For example, a ringtone may be different than ringtones for normal calls. The mobile telephone may vibrate instead of ringing.

The displayed interface 100 includes selectable interface elements 104-110 that enable the user of the mobile telephone to interact with the incoming telephone call. For example, the user may press his finger to the "Answer" interface element 104 and drag his finger to the center of the touchscreen to invoke operations for answering the incoming telephone call. Dragging a finger to the center of the screen may be considered a single-action user input. Other example single action user inputs includes taps on the screen and taps of physical buttons. A single-action user input may not include multiple taps or swipes of the touchscreen or buttons.

The user may drag the "Ignore" interface element 108 to invoke operations that stop the mobile telephone from ringing. In some examples, after dragging the "Ignore" interface element 108, the calling device (i) is disconnected from the telephone call, (ii) continues to receive auditory rings, or (iii) is directed to voicemail.

The user may drag the "Pre-Recorded Message" interface element 106 to invoke operations for playing a pre-recorded message to the calling device, where the calling device may not be presented an ability to record a voice message after the pre-recorded message is played. As an illustration, the message may state "The telephone number that you have dialed from has been classified as being associated with unwanted telephone calls. If this message is being received in error, please visit www.spam-identificationservice.com."

The user may drag the "Block Call" interface element 110 to invoke operations for blocking future calls from the incoming telephone number from being received at the mobile telephone. For example, in response to dragging the "Block Call" interface element 110 to the center of the screen, the mobile telephone may cease ringing and may store in memory the blocked telephone number. If future telephone calls are received from the blocked telephone number, the mobile telephone may not ring or otherwise provide an indication to the user that another device has called the mobile telephone.

The displayed interface 100 may include a list of categories 112 of the incoming telephone call. The list of categories may include tags that users of other mobile device have selected to categorize the telephone number after receiving incoming telephone calls from the same number. The tagging of calls by other users and the selection of tags for display on the mobile telephone is described in more detail throughout this document, for example, in reference to FIG. 4.

The interface 100 may be similar to interfaces that are displayed when the incoming telephone call is "normal." A normal call may be a telephone call where the mobile telephone has not received a message indicating that the incoming telephone call is potentially a source of spam. In some illustrations, an interface for a normal call may be similar to the interface 100, except that the interface for the normal call may not include interface elements 102, 106, 110, and 112.

FIG. 2 is a mobile telephone displaying an interface 200 that may be presented when an incoming telephone call has been answered by a user. The interface 200 may be presented in response to selecting the "Answer" interface element 104 when the incoming call has been identified as spam, or may be presented in response to answering a "normal" call. Many of the graphical interface elements depicted in interface 200 may appear in traditional interfaces that are presented to users of a mobile device. For example, the "Add Call" selectable interface element 202 may allow a user of the mobile telephone to add a third-telephone to the call. The "End" selectable interface element 204 may allow the user to terminate the telephone call. The "Dialpad" selectable interface element 206 may allow the user to view a display of numbers for generating key tones. Similarly, the "Mute" 208, "Speaker" 212 and "Hold" 214 selectable interface elements invoke operations that are recognized by skilled artisans.

The interface 200 also includes a "Report as Spam" 210 interface element. Selection by a user of the mobile telephone of the "Report as Spam" interface element 210 may invoke operations by the telephone to terminate the telephone call, similar to a selection of the "End Call" interface element 204. However, in contrast to selection of the "End Call" interface element 204, selection of the report as spam interface element 210 may invoke operations that transmit a message to a spam identification server system. The message may identify the number "1-555-555-1234" as a number that was classified by a user of the mobile device as spam. In some implementations, selection of the "Report as Spam" interface element 210 invokes a display of the interface 400 in FIG. 4.

The "Report as Spam" interface element 210 may be displayed while the incoming telephone call is connected and while voice communication is being received from the calling device. The "Report as Spam" interface element 210 may be displayed concurrently with any combination of the other interface elements 202, 204, 206, 208, 212, and 214. The interface 200 may be a first interface that is presented for display to the user upon the user selecting an "Answer" interface element 104. In other words, upon selecting the "Answer" interface element 104, the telephone call may be connected and the "Report as Spam" interface element 210 may be displayed without receipt of additional user input.

Figure 3:
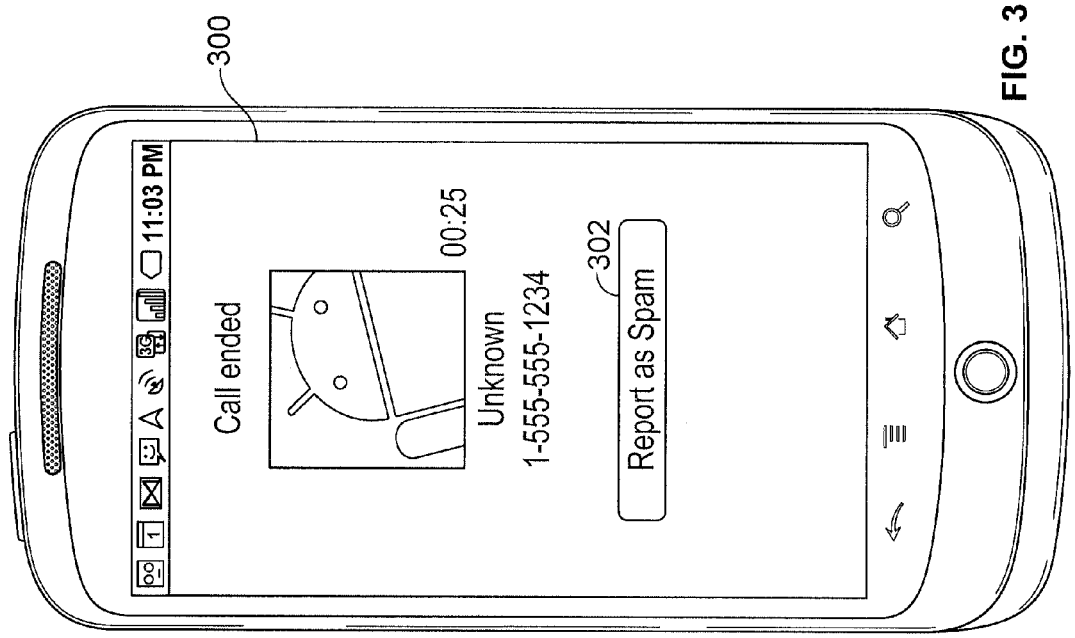
FIG. 3 is a mobile telephone displaying an interface that may be presented when a telephone call that a user answered has terminated.

FIG. 3 is a mobile telephone displaying an interface 300 that may be presented when a telephone call that a user answered has terminated. For example, the interface 300 may display when the calling device terminates the telephone call, when the call is interrupted (e.g., when the user of the mobile device steps into an elevator and the signal is lost), or when the user of the mobile device terminates the call by pressing the "End Call" interface element 204. The interface 300 may be displayed in response to a selection of the "End Call" interface element 204, either in an interface 200 that includes the "Report as Spam" interface element 210, or in an interface 200 that does not include the report as spam interface element 210. User selection of the "Report as Spam" interface element 302 may invoke operations similar to the "Report as Spam" interface element 210. For example, the interface 400 may be invoked for display.

In some examples, a user of the mobile telephone may report a call as spam after navigating past the interface 300. For example, the interface 300 may disappear after three seconds, but the user may be able to navigate into his call log, select a list of options for the received telephone call, and select a "Report as Spam" interface element from the options that are presented for the received telephone call.

FIG. 4 is a mobile telephone displaying an interface 400 that enables a user to categorize a telephone call that has terminated. The interface 400 may enable recipients of spam calls to tag calls that they have classified as spam. The selected tags may be transmitted in a communication to a spam identification server system and used by the server system in determining whether incoming telephone calls should be flagged as spam for a particular user. In some examples, the terms category, label, and tag are used interchangeably, while the term classification may refer to a more general identification of a telephone call as spam (e.g., sans user-defined labels).

The interface 400 includes an "Undo" selectable interface element 402 that enables a user of the mobile telephone to undo or retract selection of "Report as Spam" interface elements 210 or 302. In response to a user selection of the "Undo" button 402, the mobile telephone may either not transmit a message to the spam identification server system (if the mobile telephone had not transmitted such a message in response to selection of the interface elements 210 or 302), or may transmit a message to the server system that indicates that the earlier message was transmitted in error.

The interface 400 includes a "Skip Labels" selectable interface element 404 that enables a user of the mobile telephone to bypass categorizing the spam telephone call. In other words, the user may be able to classify a call that the user had received as spam, but may be able to skip selecting a label for the call by tapping the "Skip Labels" interface element 404.

The selectable interface elements 406-422 enable a user of the mobile telephone to assign tags to the telephone call. The top row of interface elements 406-410 are pull-down menus for selecting broad categories of tags. For example, a user may tap the "Commercial" pull-down interface element 408 and a predetermined list of tags that may appear. Example tags in the list may include "Telemarketer," "Debt-Collector," "Credit Card Offer," and "Cell Phone Company." The user may select any of the tags in the list. In response to the selection, (i) the pull-down menu 408 may collapse and display the text of the selected tag, (ii) the text of the selected tag may be highlighted within the pull-down menu, (iii) or the text of the selected tag may appear in a portion of the interface 400 that displays a list of selected tags (the list of selected tags is not illustrated in this example).

In some examples, the pull-down menus 406-410 are the same regardless of the telephone number that was classified as spam. In some examples, the pull-down menus 406-410, or the content within each of the pull-down menus 406-410, is selected based upon tags that have been selected by other mobile telephone users for the same telephone number. For example, if over half of the users that classify an answered telephone call as spam select a "Bulk Call" tag for the telephone call, a "Bulk Call" option may appear as one of the pull-down menus 406-410, or within one of the pull-down menus 406-410. In some examples, the interface 400 may not include the pull-down menus 406-410. In some examples, the interface 400 may include single-user-input selectable interface elements in place of the pull-down menus 406-410. For example, the interface 400 may include a "Bulk Call" selectable interface element 406, a "Car Warranty" selectable interface element 408, and a "Cold Call" selectable interface element 410.

The interface 400 may include a software keyboard 424 that enables a user to type text into the text box 420 for generating new tags or to assist in a search for tags previously generated by other users. As an illustration, Bill answered an incoming telephone call with his mobile device. Over a speaker of his mobile telephone a pre-recorded message by Democratic political candidate John Doe was playing. Bill pressed the "Report as Spam" interface element 210 to terminate the call, and in response the interface 400 was presented for display on the screen of the mobile telephone. Joe may tap his finger in the text box 420 and the software keyboard 424 may appear for display. Joe wants to label the telephone call with the particular candidate so he begins typing "John_Doe Poli" and the selectable labels 414-418 appear within the search interface portion 412 portion of the interface 400.

As Joe types additional characters, the labels 414-418 may change. The labels may be selected based on: (i) a similarity between the labels and the typed text, (ii) a popularity of the labels as selected in general, and (iii) a popularity of the labels as selected for the incoming telephone number. In this illustration, The label "John_Doe" may have appeared because the label matches text that Bill typed into the text box 420. The label "Political" 416 may have appeared because it is similar to text that Bill has typed, and because it is often selected in conjunction with selection of the "John_Doe" label 418. The "Democratic" label 414 may have appeared because it is often selected in conjunction with the "John_Doe" 412 and "Political" 416 labels, and because it is selected for the incoming telephone number by other users that classify the incoming telephone number as spam. Bill may select the interface elements 414-416 by tapping on them. In response, the elements may change in color or style, disappear from the search interface portion 412, or appear for display in another portion of the interface 400 that displays a list of selected tags (not illustrated in this example).

Joe may type words into the text area 420 and corresponding results may not appear in the search interface portion 412. If this is the case, Joe may select the "New" interface element 422. Selection of the "New" interface element 422 may add the words in the text box 420 to a list of selected tags. In other words, Bill may generate new tags to describe the content of the telephone message. The new tags may be transmitted to the server system and may appear as tags 412-416 when other mobile telephone users use a similar search interface portion 412. In some examples, the only tags that may be added as new tags are tags that do not appear as labels 414-416.

After Bill has selected a set of tags that categorize the telephone call that he classified as spam, Joe may select the "Submit Selected Labels" interface element 426. In response, the mobile telephone may transmit an electronic message to the spam identification server system that includes any combination of: (i) an identifier for the reporting telephone (e.g., a telephone number or a user account to login to the spam identification service), (ii) a telephone number of the incoming telephone call, (iii) tags that the user of the mobile telephone selected, (iv) a length of the telephone call, and (v) a time of the telephone call.

Figure 5:
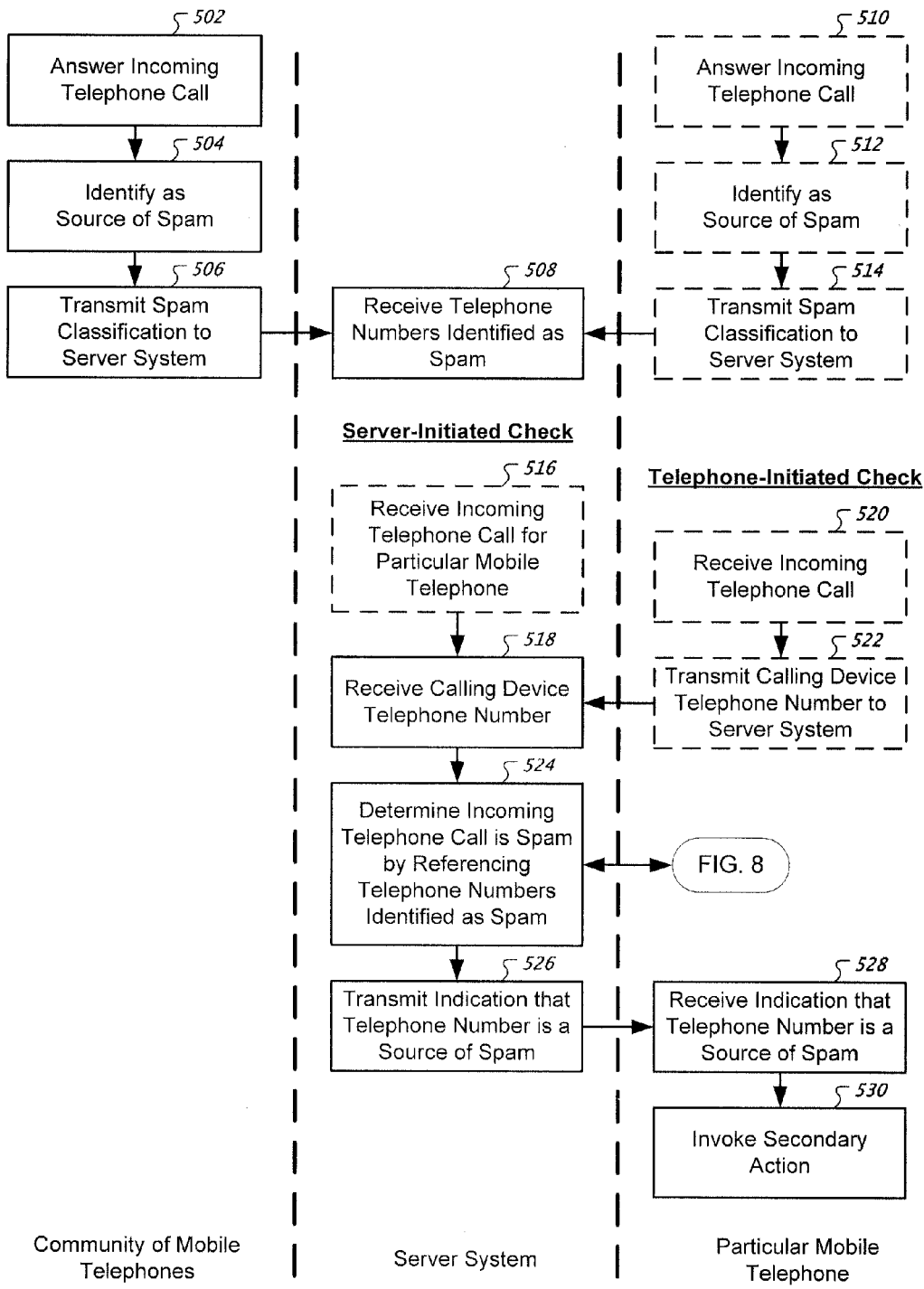
FIG. 5 is a swim lane diagram that illustrates the interaction between mobile devices and a server system that together perform telephone caller classification.

FIG. 5 is a swim lane diagram that illustrates the interaction between mobile devices and a server system that together perform telephone caller classification. More specifically, the "Community of Mobile Telephones" lane illustrates actions that are performed by a community of mobile telephones (e.g., telephones that subscribe to a spam identification service). In box 502, an incoming telephone call is answered by one of the mobile telephones in the community. For example, a user of a mobile telephone may select an "Answer" interface element 104.

In box 504, the incoming telephone call is identified as a source of spam. For example, a user of the mobile telephone that answered the call may select a "Report as Spam" interface element 210 or 302. In some examples, the identification of the incoming telephone call as a source of spam includes receiving user-selected categories that describe a type of the spam.

In box 506, the incoming telephone may, in response to the identification of the incoming telephone call as a source of spam, transmit a message to the server system that classifies the incoming telephone call as a source of spam. In some examples, the message includes identifications of the user-selected categories.

In box 508, a server system (e.g., the spam classification server system referenced throughout this document) receives the message that was transmitted by the mobile device, and that classified the incoming telephone call as a source of spam.

The actions of boxes 502-506 may be performed by multiple mobile devices, such that the server system may receive thousands or millions of messages that classify incoming telephone numbers as sources of spam. In some examples, the particular mobile telephone referenced in the "Particular Mobile Telephone Swim Lane" (which may be one of the mobile devices in the community) performs, in boxes 510-514 operations similar to those of boxes 502-506. The options of boxes 510-514 are optional because the particular mobile telephone that performs the operations of boxes 528-530 may not have identified any incoming telephone calls as spam.

The chain of boxes beginning at box 516 illustrates a server-initiated check to determine if an incoming telephone call is a source of spam. A server-initiated check may occur when telephone calls for a telephone number that is associated with a user of a mobile device are initially routed to a server system that can perform spam identification before the mobile device may receive an indication of the incoming telephone call. For example, with the GOOGLE VOICE service, a user signs up for a new telephone number and all calls to that telephone number are routed to a server system. The server system may then perform operations to route the incoming telephone call to any of a number of telephones that are associated with the user. For example, in box 516, an incoming telephone call for a particular mobile telephone and from a calling device is received at the server system.

In contrast, in a telephone-initiated check to determine if an incoming telephone call is a source of spam, the calling device may directly connect with the mobile device and the mobile device may transmit a request to a spam-identification server system to determine if the incoming telephone call is a source of spam. For example, in box 520 an incoming telephone call from the calling device is received at the particular mobile telephone. The mobile telephone may receive an electronic indication that another telephone device is attempting to initiate a voice conversation with the mobile telephone. In box 522, the mobile telephone transmits the calling device telephone number to the server system.

In box 518, the calling device telephone number is received by the server system. In the server-initiated check, the telephone number may be received in the communication that identifies that an incoming telephone call is being received. In the telephone-initiated check, the telephone number may be received in the transmission of the calling device telephone number (box 522).

Figure 8:
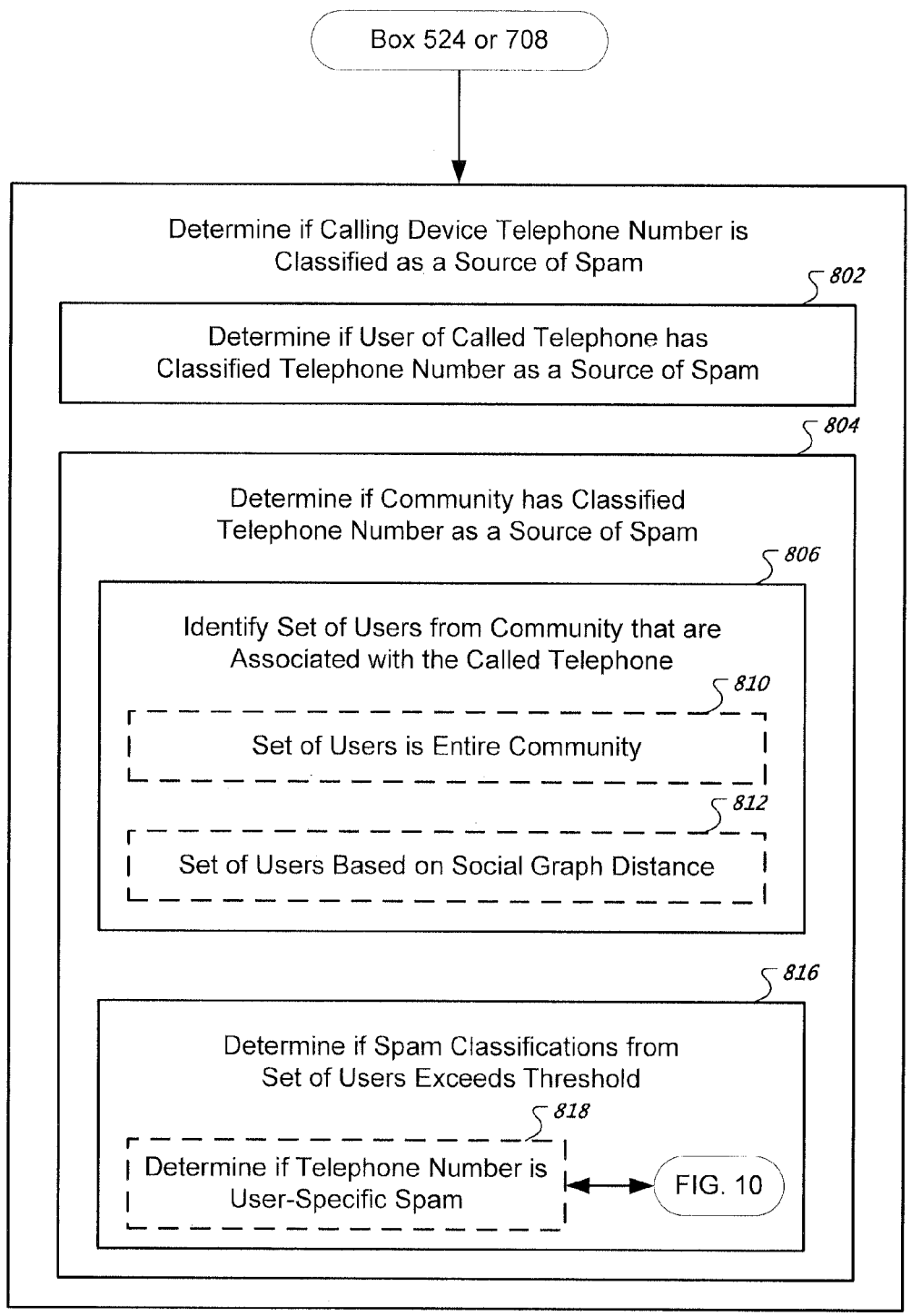
FIG. 8 is a flowchart of an example process for determining if a calling device telephone number is classified as a source of spam.

In box 524, an incoming telephone call is determined to be spam by referencing the telephone numbers that have been identified as spam by the community of mobile telephones. For example, the server system may compare the incoming telephone call number to the telephone numbers that were received in box 508. The determination of box 524 is described in more detail throughout this document, for example, in connection with FIG. 8. The operations described in FIG. 8 are not necessarily performed by the particular mobile telephone and may be performed by the server system.

In box 526, an indication that the incoming telephone number is a source of spam is transmitted from the server system to the particular mobile telephone.

In box 528, the indication that the telephone number is a source of spam is received at the particular mobile telephone.

In box 530, a secondary action is invoked on the particular mobile telephone. The secondary action may include performing operations that are not performed if the server system determined that the incoming telephone call was not spam. For example, the interface elements 102, 106, 110, and 112 may appear for display by the particular mobile telephone. As another example, the particular mobile telephone may invoke the playing of a different ringtone than if the incoming telephone call was not determined to be spam. In some examples, a user of the mobile telephone is not able to determine that the mobile telephone is receiving a telephone call until the indication of box 528 is received. The mobile telephone may remain in its previous state of display or user interaction. In another example, the mobile telephone may begin to ring when the incoming telephone call is received (e.g., at box 520), and upon receiving the indication that the telephone number is a source of spam (e.g., at box 528) the mobile telephone may modify the interface 100 to add the interface elements 102, 106, 112, and 110.

Figure 6:
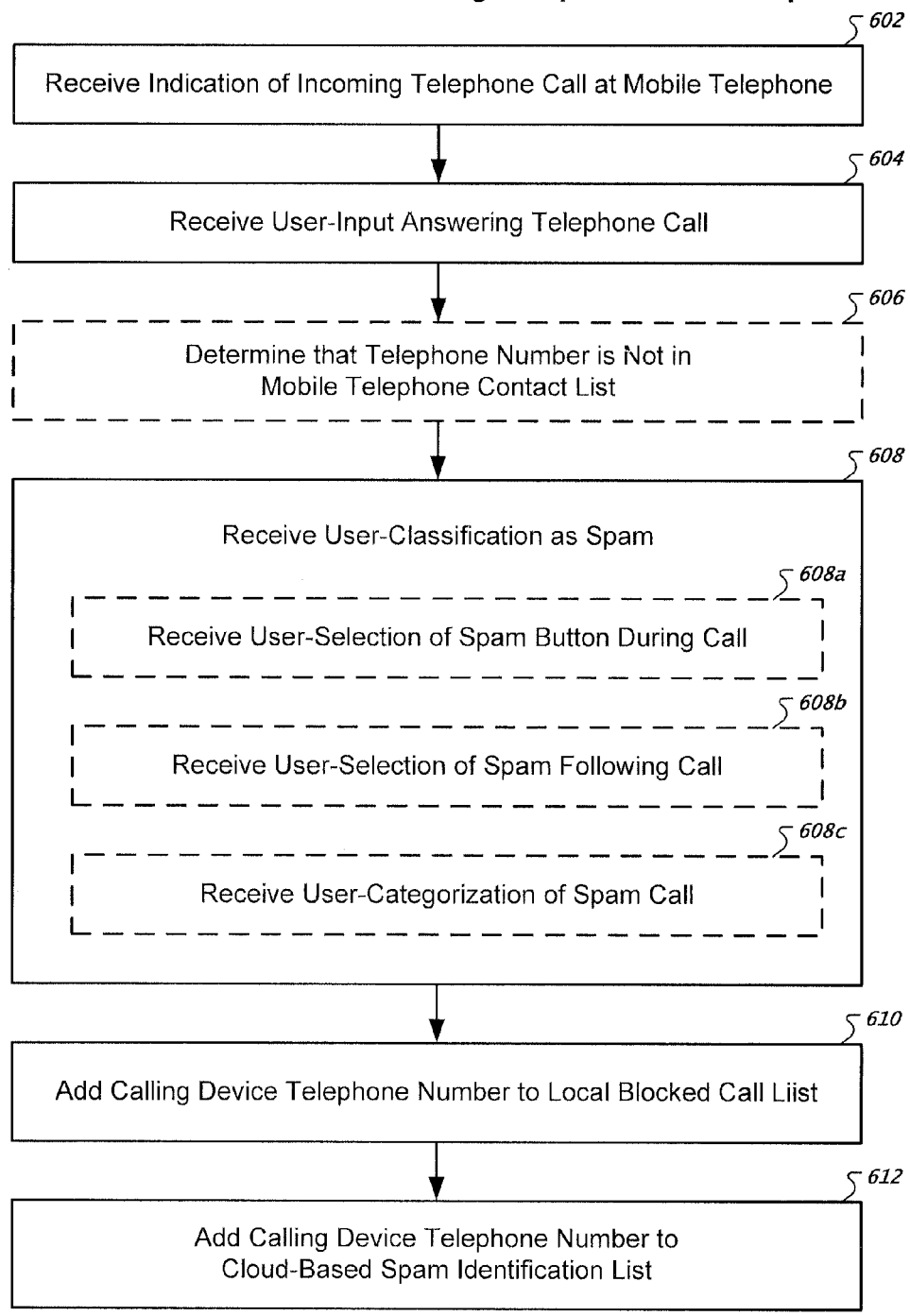
FIG. 6 is a flowchart of an example process for performing a user-classification of an incoming telephone call as spam.

FIG. 6 is a flowchart of an example process for performing a user-classification of an incoming telephone call as spam. The operations of boxes 602-612 may be similar to the operations of boxes 502-506 and 510-514.

In box 602, an indication of an incoming telephone call is received at a mobile telephone. For example, Frank may be walking down the street when his phone receives an electronic communication that indicates that another device is requesting to establish a voice communication with his phone. In response to receiving the communication, Frank's phone begins to ring and vibrate. Frank may look at the display on his phone and see the interface 100 that is depicted in FIG. 1. The interface 100 may or may not include the spam-unique interface elements 102, 106, 110, and 112.

In box 604, user-input is received that answers the incoming telephone call. For example, Frank may press his finger on the mobile telephone's touchscreen at a position of the "Answer" interface element 104. Frank may drag his finger to the right, and upon this sequence being properly performed, the mobile telephone may establish a voice communication between Frank and the calling device. Once established, Frank may be able to hear audio that is provided by the calling device and the calling device may be able to hear audio that is provided by Frank.

In box 606, the optional step of determining that the incoming telephone number is not in the mobile telephone contact list is performed. If the incoming telephone number is in the mobile telephone's contact list, the mobile telephone may not perform the operations of boxes 608-612. Thus, a user may not be able to classify an incoming telephone call as spam if the incoming telephone call is from someone in the user's contact list. The operations of box 606 may be performed to protect against malicious use of the spam identification service by some users of the spam identification service. For example, if users were able to mark as spam individuals in their contact list, the spam identification service may be prone to pranks or other malicious use. While users may not be likely to add spammers to their contact lists, it is possible that some users save contact records for spammers so that they know who is calling. Thus, the operations of box 606 may be optional.

In box 608, user-classification of a telephone call that was answered as spam may be received by the mobile telephone. For example, the mobile telephone may receive user-selection of the spam reporting button 210 during the call (box 608*a*) or the spam reporting button 302 after the call (box 608*b*). In some examples, the mobile telephone receives user-categorization of an incoming telephone call, for example, as described in connection with FIG. 4 (box 608*c*).

In box 610, the calling device telephone number may be added to the local blocked call list. For example, the mobile telephone may store the incoming telephone number in locally accessible computer-readable memory (e.g., memory that may be accessed without the use of wirelessly transmitted data). In other examples, the mobile telephone may transmit the telephone number to the server system for remote storage in a blocked call list for the mobile telephone. The blocked call list may be considered a blacklist, such that telephone calls received from numbers that are in the blocked call list may not ring through to the mobile telephone. For example, the interface 100 may not appear when a call is received from a number in the blocked call list. Instead, the user of the mobile telephone may not be provided any indication that a telephone call is being received.

In box 612, the calling device telephone number is added to a cloud-based spam identification list. For example, the mobile telephone may transmit the calling device telephone number to the spam identification service server system. The server system may store the calling device telephone number in a database of telephone numbers that have been identified as spam.

Figure 7:
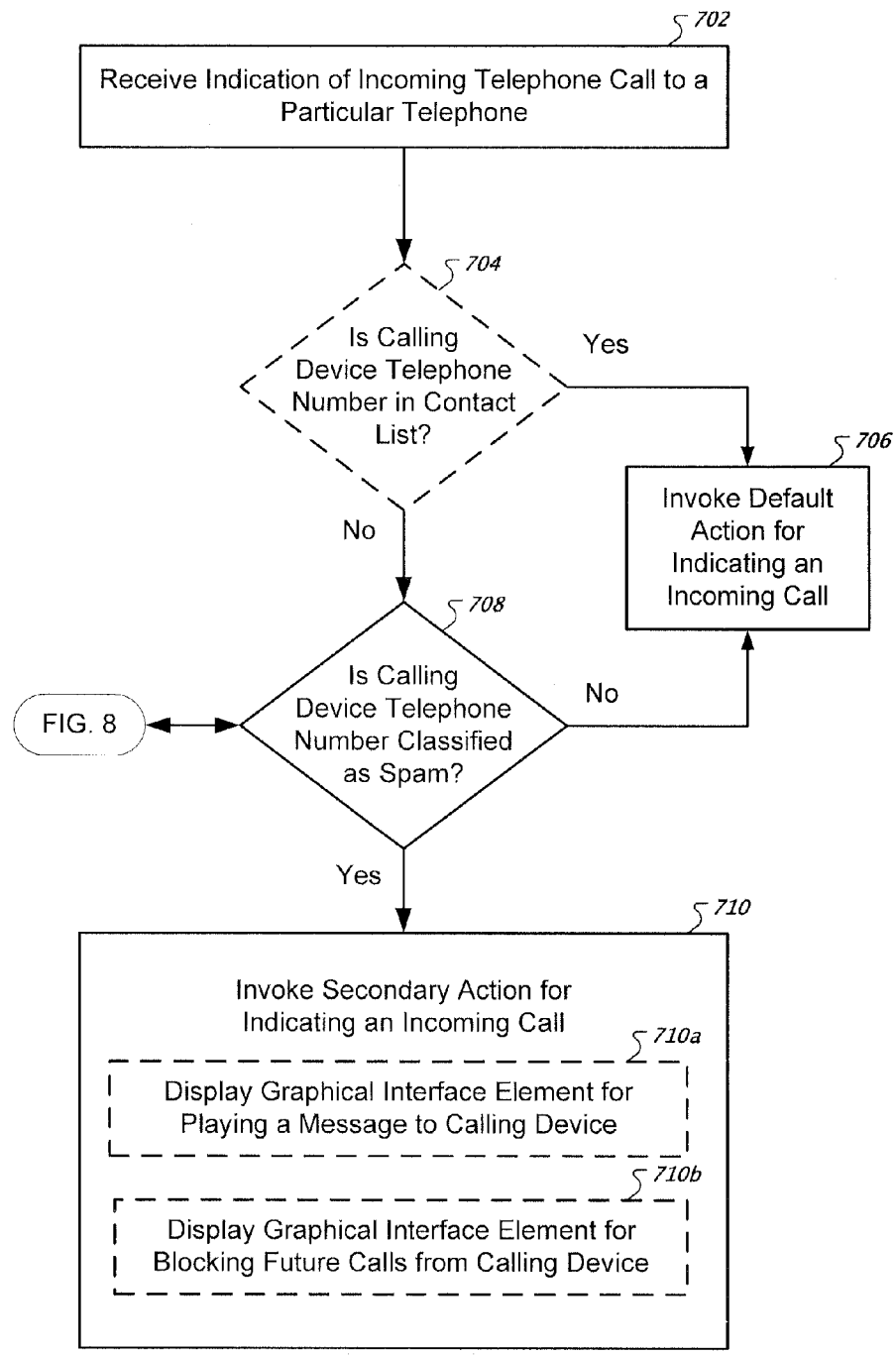
FIG. 7 is a flowchart of an example process for indicating that an incoming telephone call is classified as spam.

FIG. 7 is a flowchart of an example process for indicating that an incoming telephone call is classified as spam. In box 702, an indication of an incoming telephone call is received. For example, the indication may be received at a server system (e.g., as in box 516) or at a telephone device (e.g., as in box 520).

In box 704, a determination may be made whether the calling device telephone number is in the contact list for the called telephone. The contact list may be stored at the telephone, at a server system, or synchronized between the telephone and the server system. The determination may be performed because the mobile telephone's contact list may be deemed to include telephone numbers that the mobile telephone user does not consider spam numbers. Thus, the user of the mobile telephone may not desire to view spam prompts for users in their address book and not performing spam determinations for such occurrences may save computer resources.

In other words, the address book may be deemed a "white list" of telephone numbers that are allowed to pass through to the caller without being flagged as spam, even though the telephone numbers may otherwise be flagged as spam. In some examples, the operations of box 704 determine if the calling device telephone number is in a "white list" that is defined by the user of the mobile telephone and is separate from the contact list. In some examples, the operations of box 704 are optional, as users of mobile telephones may be interested in receiving indications that users in their contact lists have been identified as spammers.

In box 706, a default action for indicating to a user of the mobile device that an incoming call is being received is invoked. For example, the mobile device may present the interface 100 for display without the interface elements 102, 106, 110, and 112. The mobile device may display an incoming call interface that does not include any visual or auditory indication that the incoming telephone call is a source of spam.

In box 708, a determination whether the calling device telephone number is classified as spam is performed. For example, a server system may compare the incoming telephone number to a list of telephone numbers that other mobile device users have classified as spam. If the incoming telephone number is not classified as spam, the default action for indicating an incoming call is performed (box 706). If the incoming telephone number is classified as spam, a secondary action for indicating an incoming call is performed. The determination of box 708 is described with more detail in reference to FIG. 8.

In box 710, a secondary action for indicating an incoming call is invoked. For example, the mobile telephone may present for display the interface 100—including the interface elements 102, 106, 110, and 112. The secondary interface may include a visual indication to a user of the mobile telephone that the incoming telephone call has been classified as a potential source of spam. The mobile telephone may also be in a state that enables a user of the mobile telephone to invoke operations for performing actions that may otherwise not be available for interacting with an incoming telephone call. For example, the "Pre-Recorded Message" and "Block Call" selectable interface elements 106 and 110 may be presented on the mobile telephone's display (boxes 710*a* and 710*b*). The selectable interface elements 106 and 110 may otherwise not be displayed if the incoming telephone call is not classified as a source of spam. The display may include a list of one or more of the users that classified that incoming telephone call as spam (e.g., those users that are in the called user's contact list).

FIG. 8 is a flowchart of an example process for determining if a calling device telephone number is classified as a source of spam. The determination may be performed at the called telephone device, at the server system, or split between the two computerized systems.

In box 802, a determination whether a user of the called telephone has classified the telephone number as a source of spam is performed. As an illustration, Steve (a user of a mobile telephone) may have logged into a user account for a spam identification service with a username and a password. Upon logging in, the mobile telephone may be associated with Steve's user account. Steve may have previously classified a telephone number as a source of spam while logged into the user account (e.g., by adding the number to a black list or selecting the "Report as Spam" interface elements 210 or 302. Upon receiving an incoming telephone call, the mobile telephone or a server system in communication with the mobile telephone may determine if Steve previously classified the incoming telephone number as a source of spam.

If Steve previously classified the incoming telephone number as a source of spam, a secondary action for indicating that the incoming call is being received may be invoked (e.g., as with the operations of box 710). In some examples, an incoming call that has been previously classified as spam by a user of the called device may be blocked. In other words, Steve's mobile telephone may not indicate to him that an incoming call is being received. The determination of box 802 may be performed by a server system or may be performed locally on the mobile telephone. For example, the mobile telephone may receive an indication of an incoming telephone call, determine that the incoming telephone number has not been previously classified by a user of the telephone as spam, and submit a request to a server system to determine if the community of users has classified the incoming telephone number as a source of spam.

In box 804, a determination whether a community has classified the incoming telephone number as spam is performed. For example, the spam identification service server system may identify a set of users from the community of mobile telephones (box 806) and determine if the amount of spam classifications from the set of users exceeds a threshold amount of classifications (box 816).

In box 806, a set of users from the community that are associated with the called telephone are identified. The community may include users of telephones that subscribe to the spam identification service. For example, if the spam identification service requires users of mobile telephones to download a particular application, all users that downloaded the application set up an account may be included in the community. In examples where the spam identification service is performed for all users of a particular internet service provider (ISP) or telephone company, all users of the ISP or telephone company may be included in the community. The community may not include users that have requested to opt out of the community. In examples where an operating system platform for a mobile device performs spam identification services, all users of the operating system platform may be included in the community.

In box 810, the set of users that are associated with the called telephone include all users in the community. In other words, the entire community of users of the mobile telephone are identified as relevant to a determination whether the incoming telephone call is spam.

In box 812, the set of users includes users in the community that are within a particular social graph distance from the called user. An illustrative social graph distance may be two "relationships," where a relationship is an association between two users based on one of the users being listed in the other users contact list. Thus the set of users for the called mobile telephone may include: (i) individuals that are listed in the called telephone's contact list, and (ii) individuals that are listed in the contact lists of the individuals that are listed in the called telephone's contact list. In other words, the set of users may include "first-order acquaintances" or "friends" of the called telephone's user, and the "second-order acquaintances" or "friends of friends" of the called telephone's user.

Figure 9:
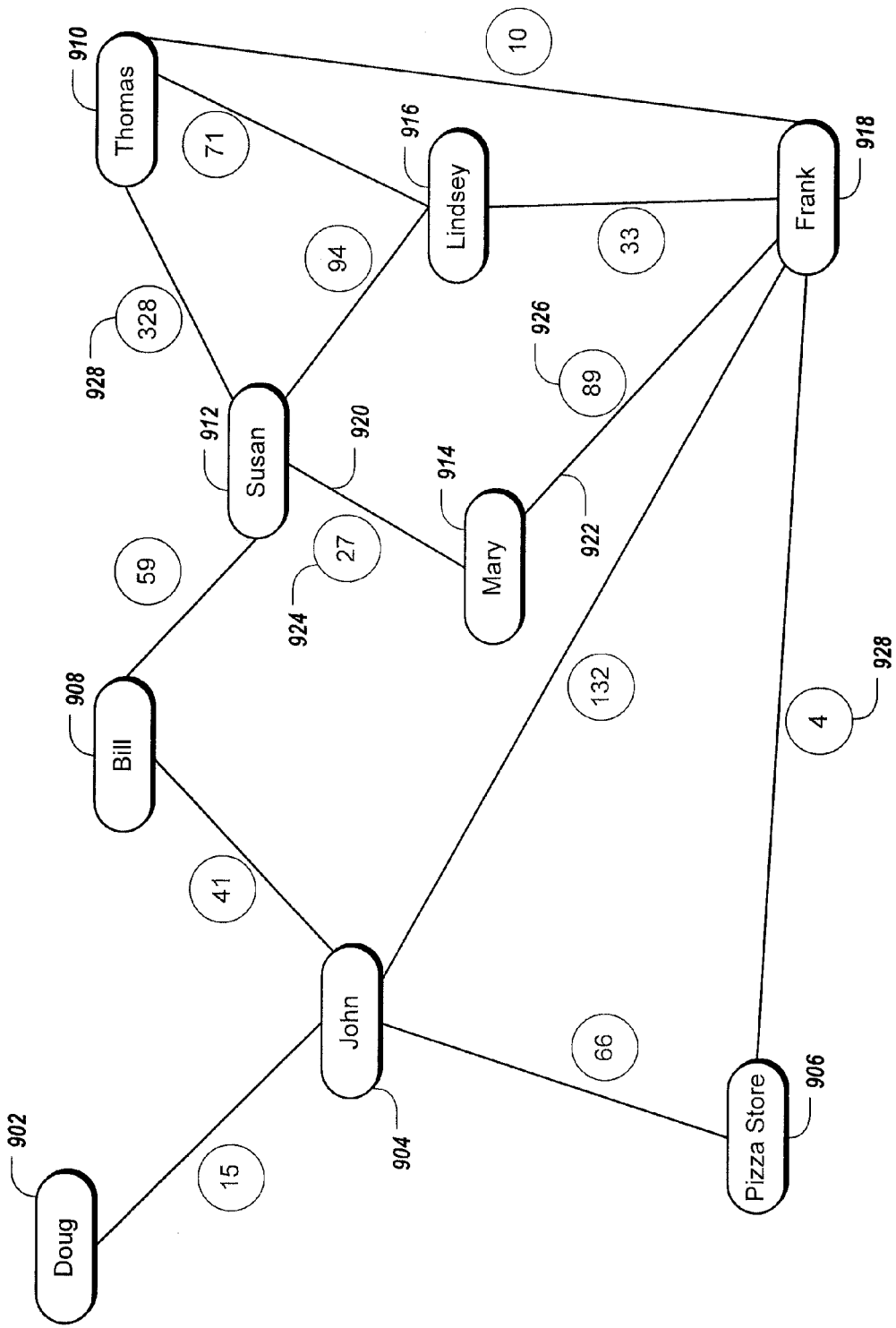
FIG. 9 is a conceptual representation of a social graph.

As an illustration, a conceptual representation of a social graph is presented in FIG. 9. Although depicted for illustrative purposes as a set of nodes of edges, in memory the social graph may be stored in a database or table. The nodes in the social graph (e.g., 912 and 914) represent users of the spam identification service. The edges (e.g., 920 and 922) represent relationships between the users. As described above, a relationship may be formed if a user is in another user's contact list. Other mechanisms for generating relationships between the users are contemplated. For example, a relationship may be formed if a user: (i) emails another user, (ii) calls the other user, (iii) text messages the other user, or (iv) subscribes to blog postings that the other user submits to a blog posting service. A relationship may require a reciprocal communication (e.g., a text message or call back from the other user).

In this illustration, an incoming telephone call is directed to Mary's mobile telephone. The criteria for identifying the set of users from the community may include identifying the users within a distance of "two relationships" from Mary. Susan 612 and Frank 618 are the users within a distance of one relationship from Mary. The users within a distance of two relationships also includes the Pizza Store 606, John 604, Bill 608, Thomas 610, and Lindsey 616. In other words, the users within a distance of two relationships are the users that have a relationship with Susan 612 or Frank 618. In this illustration, Doug 602 is the only user that is not within a distance of two relationships from Mary. In a real-world example with thousands or millions of users in the community, a distance of two, three, or four from a particular user in a social network graph may include a small fraction of the total number of users in the community.

In some examples, relationships between users may be weighted. Each weighting may be based upon: (i) the type of relationship (e.g., if each user is in each others address book or if only one of the users has emailed the other user), (ii) a frequency of interaction (e.g., a frequency of any combination of calls, text messages, voicemails, and emails), and (iii) how recent the interaction was. For example, the relationship of Mary to Susan may be weighted 27 (item 644) while the relationship of Mary to Frank may be weighted 89 (item 626).

A distance may be a simple determination of the order of the acquaintance. For example, a first-order acquaintance may have a distance of 1, a second-order acquaintance may have a distance of 3, and a third-order acquaintance may have a distance of 9. Conversely, the distance may represent a decreasing value as the distance increases (e.g., 1, 0.33, and 0.11).

In some implementations, the distance value between two users may account for the weight of the relationships, in addition to a number of relationships connecting the users. As an illustration, the distance between Mary and Thomas, and Mary and the Pizza Store may be computed. Although numerous mechanisms for weighting distance are contemplated, in this illustration the example weight and a representation of the number of relationships are simply multiplied. A distance between Mary and Thomas is calculated as 1 (a numerical representation of the first-order relationship)*27 (the first-order strength)+0.33 (a numerical representation of the second-order relationship)*328 (the second-order strength) =166. A distance between Mary and the Pizza store is calculated as 1 (the numerical representation of the first-order relationship)*89 (the first-order strength)+0.33 (the numerical representation of the second-order relationship)*4 (the second-order strength)=90. In this illustration, even though Frank is identified as having a stronger relationship with Mary than Susan, Thomas has a stronger relationship with Mary than the Pizza Store, because the strength of Susan and Thomas' relationship is significantly stronger than Frank's relationship to the Pizza Store. Susan and Thomas may be married and communicate frequently, while Frank may only have called the Pizza Store's phone number a single time and may not have the phone number in his contact list.

In some examples, the distance is calculated based on a shortest number of relationships between two users. In some examples, two paths include a same number of relationships. For example, Lindsey is a second-order relationship of Mary through both Susan and through Frank. Lindsey may be treated as though she is closer in the social network graph (e.g., associated with a higher distance value) than if she were only a second-order relationship through only Susan. For example, the distance through Frank may be multiplied by ⅔ and summed with ⅔rds the distance through Susan.

The set of users may be determined to be the users that are within a threshold distance (e.g., "225"). In some examples, the set of users may be determined to be a threshold number of users with the most favorable distances (e.g., the "800" users with the highest distance values, where a high distance value is indicative of a close relationship and high interaction). In some examples, the set of users is determined to be the users that are within a threshold number of relationships (e.g., all individuals with a first, second, or third order relationship to Mary).

In box 816, a determination whether the spam classifications from the set of users exceeds a threshold is performed. For example, from the set of users that are identified in box 806, a number of user-generated spam classifications may be determined. The determined number may be compared against a threshold (e.g., 3 spam classifications) to determine if the threshold has been surpassed. If the threshold has been surpassed, the calling device telephone number may be determined to be a source of spam. If the number of classifications is below the threshold (e.g., only a single spam classification has been received), then the calling device telephone number may be determined to not be a source of spam.

Utilizing a threshold may ensure that a small number of spam classifications that (i) are mistakenly applied, (ii) are by malicious users, or (iii) are by individuals that classify an undue amount of incoming telephone calls as spam, do not skew the identification of incoming telephone calls as spam. In some examples, however, a threshold of a single spam classification by a user in the determined set of users is used. Thus, a single spam classification for a particular telephone number may be sufficient for the particular telephone number to be flagged as a spam telephone call for at least some other users.

In box 818, a determination whether the incoming telephone number is user-specific spam is performed. The operations of box 818 are described in more detail with reference to FIG. 10.

Figure 10:
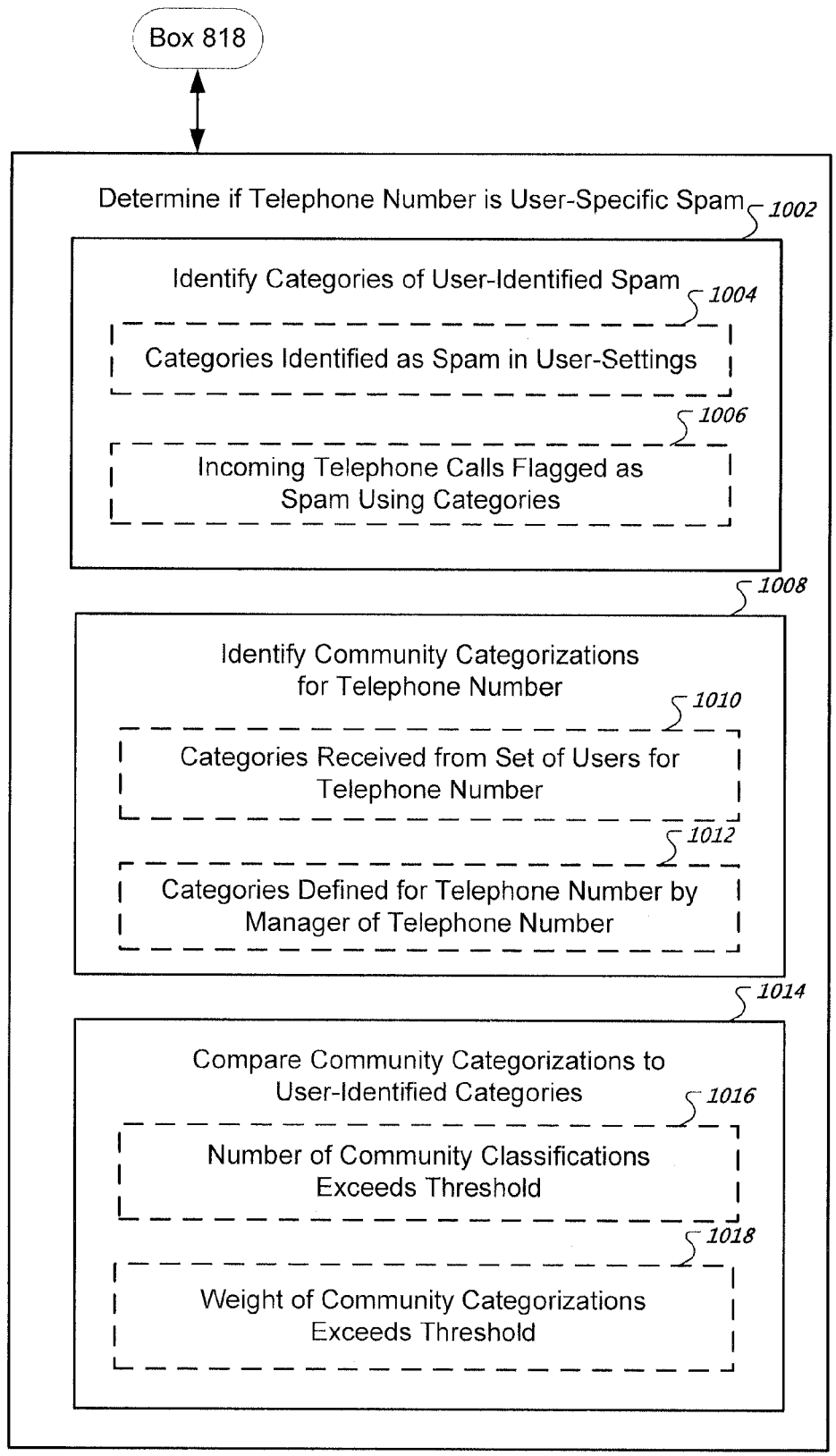
FIG. 10 is a flowchart of an example process for determining if a telephone number is user-specific spam.

FIG. 10 is a flowchart of an example process for determining if a telephone number is user-specific spam. For example, an incoming telephone call may be more likely to be flagged as spam for the called device if other users that classified the telephone number as spam tagged the telephone call as a particular type of spam that the called user has indicated that he is not interested in receiving. Such a "category-specific" spam weighting may be used to modify the threshold or to weight the classifications by other users. For example, if the called user has indicated that he does not wish to receive "Republican" spam telephone calls, then a spam classification by a user that classified a call as spam and categorized the call as "Republican" may be weighted more heavily than a call that was not categorized as "Republican." The threshold may be more easily surpassed as the individual classifications are weighted more heavily (e.g., each classification may be weighted between 1 and 20 based on the categorization of the classification, and the threshold may be 500).

In box 1002, categories of user-identified spam for the called user are identified. Categories of user-identified spam are identified because not all users of the spam classification service may consider the same types of calls spam. As an illustration, a Republican party operative may not deem a pre-recorded message from a Republican candidate spam, while the same individual may consider a fundraising call by a person from a Democratic fund raising call center spam.

In box 1004, the categories may be identified as spam by the called user in a settings page. For example, the user account that corresponds to the called telephone may have a web-accessible settings page that enables the user of the called phone to select the categories of spam that he does not want to receive. As an illustration, the user may select the categories "Commercial Telemarketers" and "Democratic Party," but may not check the categories "Non-Profit Telemarketers" and "Green Party."

In box 1006, the identification of categories is performed by determining the categories that the user selects for incoming telephone calls that the user classifies as spam. As an illustration, the user of the mobile telephone may use the interface 400 to categorize a particular call as "Democratic," "Political" and "John_Doe." These categories may be stored for the user and selected as the categories of user-identified spam. In some examples, each category of user-identified spam may be weighted based on how often and how recent the particular user selected the category for a received telephone call.

In box 1008, the community categorizations for the telephone number are identified. In box 1010, the categories are those received for the incoming telephone number from the set of users determined in box 806. As an illustration, the set of users may include the seven hundred users that have are determined to be the closest to the called user. A list of categories for the calling telephone number may be compiled from the four of the seven hundred users that classified the calling telephone number as spam and that supplied categories. The four users categories were: (i) Political, Democratic, John_Doe; (ii) Political, Recorded_Message; (iii) Democratic; and (iv) Political, Democratic, Recorded_Message. Thus, in this illustration the identified categories are: Political (used three times), Democratic (used three times), Recorded_Message (used two times), and John_Doe (used one time).

In box 1012, the categories are defined for the telephone number by a manager of the telephone number. For example, a company that operates a bulk calling service may provide a categorization of the telephone call to the spam identification service. In some examples, the company may be required by law to provide the categorization. In other examples, the company may voluntarily provide the categorization. The company may realize that providing classifications may enable the company's calls to get through to selective customers, while otherwise the spam classification service may block all calls from the company that are directed to the spam identification service's subscribers.

In box 1014, the community categorizations are compared to the user-identified categorizations. If a criteria is met, the incoming telephone call is flagged as spam. If the criteria is not met, the incoming telephone call is not flagged as spam.

In box 1016, a determination whether a number of community classifications exceeds a threshold is performed. The determination may not account for user-categorizations of the incoming telephone number. Thus, if the incoming telephone number has been classified as spam a certain number of times, the incoming telephone number may be flagged as spam for the called device regardless of the categorization of the spam. In some examples, each of the classifications is weighted based on the distance of the classification to the called user.

In box 1018, a determination whether the weight of the community categorizations exceeds a threshold is performed. Each categorization may receive an increased weight based on: (i) a quantity of the categorizations by the community of users, (ii) a quantity of use of the categorization by the called user, (iii) a distance between the called user and the community users that applied the categorization to answered telephone calls. Thus, an incoming telephone call may be likely to be flagged for an incoming telephone user as spam if the incoming telephone user has applied the category "Debt Collector" to dozens of answered telephone calls and the incoming telephone call has been categorized as "Debt Collector" several times by individuals in the called user's telephone contact list.

In some examples, a classification of a telephone call as spam is assigned a weight that may be fixed or based on a distance of the user that classified the telephone call as spam to the called user. The assigned weight may be modified based on a similarity of categorizations between the called user and categorizations of the incoming telephone call. Thus, an incoming telephone call may be flagged as spam if it was classified as spam without any categorizations, however, less classifications may be required for a telephone number to be flagged as spam if user-categorizations for the telephone number are similar to categorizations of spam calls by the incoming user for other incoming telephone calls.

Figure 11:
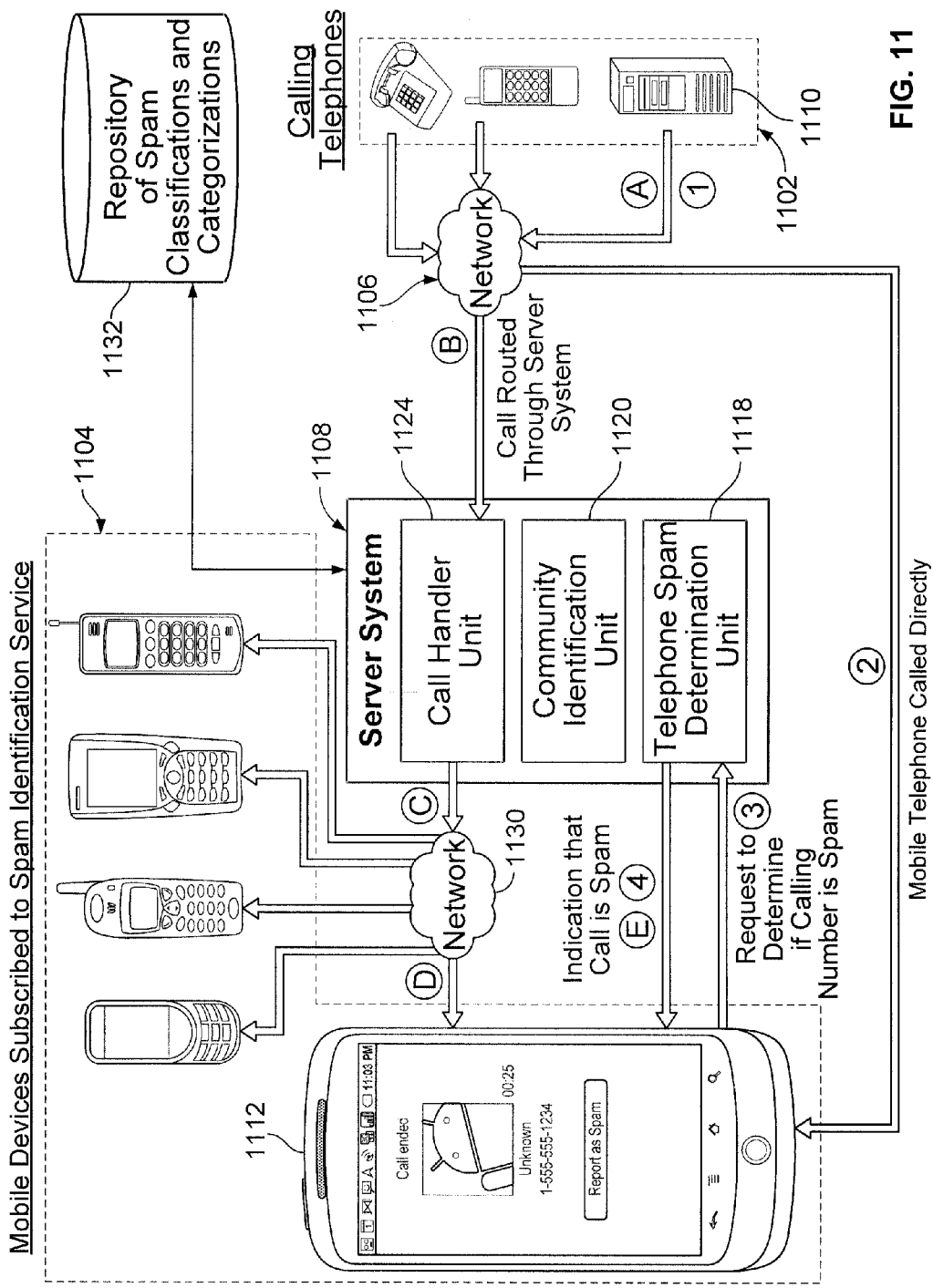
FIG. 11 is an example system for performing telephone caller classification.

FIG. 11 is an example system for performing telephone caller classification. The system includes multiple calling telephones 1102 that can call any of multiple telephones 1104 that are subscribed to the spam identification service. Calls to the subscribing telephones 1104 may be routed from the calling telephone to the called telephone 1112 either directly over a network 1106 (e.g., as with arrows "1" and "2") or through a spam-classification server system 1108 (e.g., as with arrows "A," "B," "C," and "D"). In each example, the server system 1108 may determine whether the incoming telephone call is a spam telephone call.

In this illustration, the telephone 1110 is a computerized bulk calling device that is configured to sequentially connect to multiple telephones and play a pre-recorded message. The bulk calling device 1110 dials a number that is associated with a user of the mobile telephone 1112. Telephone exchanges in network 1106 route the telephone call to either the server system 1108 or the mobile telephone 1112. The network 1106 may be the internet (e.g., if the call is a VoIP call), the public switched telephone network, or a combination of both.

In a first example, the call from the bulk calling device 1110 is routed directly to the mobile telephone 1112 without passing through the server system 1108 (as illustrated by arrows "1" and "2"). The mobile telephone 1112 receives an indication of the incoming telephone call and sends to the server system 1108 a request to determine if the calling device telephone number is a spam telephone number (as indicated by arrow "3"). The telephone spam determination unit 1118 performs operations to determine if the calling device telephone number is a spam telephone number. For example, the telephone spam determination unit 1118 may perform the operations described with reference to FIGS. 8 and 10. The community identification unit 1120 may be used by the telephone spam determination unit 1118 to determine a set of users that are associated with the called telephone (e.g., the operations of box 806) for use in the spam determination.

In response to determining that the incoming telephone call is spam, the telephone spam determination unit 1118 may transmit an electronic message back to the mobile telephone 1112 that indicates that the incoming telephone call is spam (as indicated by arrow "4"). In response to receiving the indication, the mobile telephone 1112 may present for display an interface that indicates that the incoming telephone call is spam (e.g., the interface 100).

In a second example where the telephone call from the bulk calling device 1110 is directed to the server system 1108 (as illustrated by arrows "A" and "B"), the call handler unit 1124 of the server system receives the incoming telephone call and determines which of multiple devices that are associated with a user of the called telephone number to direct the telephone call. For example, the user of the mobile telephone 1112 may also use a business telephone and a home telephone (not illustrated). The user may configure the server system so that calls directed to the server system that are for the user are routed to the business telephone during working hours and the home telephone during non-working hours. The server system may be configured to always route the incoming telephone calls to the mobile telephone 1112, so that the mobile telephone 1112 may ring concurrently with one of the home or business telephones.

The telephone spam determination unit 1118 may operate similarly when the call from the calling device 1110 is routed directly to the server system 1108 as when the call is routed directly to the mobile telephone 1112 (except that the receipt of the call at the server system 1108 (as indicated by arrow "B") instead of the request "3" may trigger the determination of the telephone spam determination unit. If the telephone spam determination unit 1118 determines that the incoming telephone call is spam, the indication (as indicated by arrow "E") may be transmitted concurrently with or subsequent to the routing of the call from the call handler unit 1124 to the mobile telephone 1112 (as illustrated by arrows "C" and "D" and network 1130).

The mobile devices subscribed to the spam identification service 1104 may transmit requests to determine if a calling telephone number is spam (e.g., as with arrow "3") and may receive indications that a call is spam (e.g., as with arrow "4" or "E"). Also, the subscribing mobile devices 1104 may be able to classify and categorize incoming telephone calls as spam (e.g., as with FIGS. 2-4). The received classifications and categorizations may be stored in a repository 1132 that is accessible to the server system 1108.

In various examples, the use of the term "spam" in this document refers to voice communications that may be unsolicited. Often the telephone call is from an individual or organization to whom the called party has never previously communicated. Examples include prerecorded, commercial telemarketing calls. Such calls are sometimes illegal, but sometimes are not (e.g., the playing of political messages may be except from rules that prevent an automated playing of prerecorded messages).

In various examples, the operations described in this document may be performed for text messages to prevent text message spamming (also referred to as mobile spamming, SMS spam, text spam, SpaSMS, and m-spam). For example, text messages that are received by a user may include a graphical interface element that indicates to the texted user that the text message may be a source of spam. Even though the user may read the text message anyways, the user may be more likely to classify the texting device telephone number as a source of spam and categorize a type of the text spam. Thus, the spam identification server may perform a determination (e.g., similar to the operations described in reference to FIGS. 7-8) for incoming text messages based on classifications and categorizations by subscribers of the spam identification service. Incoming text messages that are associated with a high "spam" score may be blocked before they reach the texted mobile device (e.g., to save texted mobile device from charges associated with unsolicited text messages). The blocking may be user-specific (e.g., as described with reference to FIG. 10).

In various examples, the use of the term "mobile telephone" throughout this document may reference a desk telephone or a soft telephone that can communicate digital data in addition to voice signals. "Mobile telephone" may be used for illustrative purposes to distinguish the called telephone from the calling telephone, which may be a plain old analog telephone that cannot communicate digital data signals. The use of the term mobile telephone and application telephone may be used synonymously. An application telephone may be a handheld mobile computing device that enables the user to make telephone calls and install applications that were downloaded from a server system connected over the internet.

In various examples, an IP address or username may be "dialed" instead of a standard 10-digit telephone number. Similarly, the calling device may be associated with an IP address or username instead of a standard 10-digit telephone number. In various examples, a mobile telephone may not permit a user to classify a telephone call as spam if the incoming telephone call was answered. Thus, users may be prevented from flagging as spam calls from telephone numbers that were not answered by the user and that the user simply did not recognize or that were accidentally dialed improperly.

Although this document may refer to actions taken by selecting interface elements on a touchscreen of a mobile telephone, such references are also contemplated to include a selection of a physical button. In any of these scenarios, operations that are described as being invoked by user-selection of an interface element may not be invoked upon user selection of a physical button until the user-selectable interface element is described as appearing on the telephone display.

Figure 12:
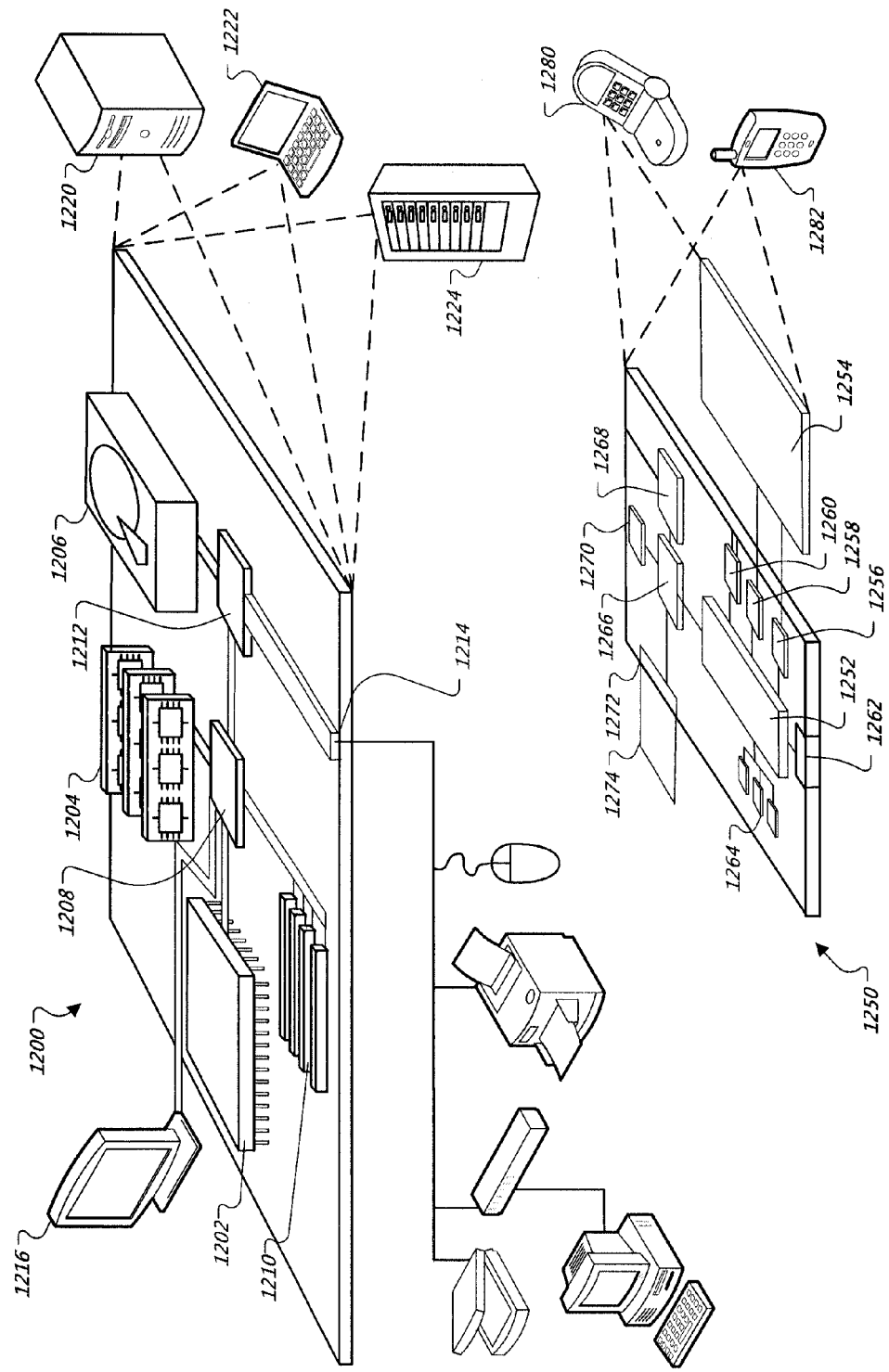
FIG. 12 is a block diagram of computing devices that may be used to implement the systems and methods described in this document, as either a client or as a server or plurality of servers.

FIG. 12 is a block diagram of computing devices 1200, 1250 that may be used to implement the systems and methods described in this document, as either a client or as a server or plurality of servers. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. Additionally computing device 1200 or 1250 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT (Thin-Film-Transistor Liquid Crystal Display) display or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252 that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smartphone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing telephone caller classification may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method of identifying that an incoming telephone call originating from a first telephone number and directed to a second telephone number is or potentially is from a source of telephone spam, the method comprising:
   identifying, by a computing system having a processor and memory, individuals that are within a predetermined distance in a social network graph of a person associated with the second telephone number;
   accessing a plurality of classifications associated with previous calls from the first telephone number, wherein:
      the classifications are submitted by the identified individuals, and
      a classification indicates whether or not a previous call from the first telephone number was from a source of telephone spam;
   identifying one or more of the plurality of classifications that indicates that a previous call from the first telephone number was from a source of telephone spam;
   determining a weight for each of the identified one or more classifications, wherein a weight depends on a relative distance in the social network graph between an individual who submitted the classification and the person associated with the second telephone number;
   combining the determined weights;
   determining that the combined weights exceed a predetermined threshold;
   determining that the incoming telephone call is or potentially is from a source of telephone spam based on the determination that the combined weights exceed a threshold; and
   providing to a telephone associated with the second telephone number an indication that the incoming call is or potentially is from a source of telephone spam based on the determination that the incoming telephone is or potentially is from a source of telephone spam.

2. The method of claim 1 wherein the social network graph represents relationships between subscribers to a telephone spam identification service.

3. The method of claim 2 wherein first and second subscribers to the spam identification service are considered by the computing system to be related and separated by a first predetermined distance in the social network graph if the second subscriber is listed in an electronic telephone contact book of the first subscriber.

4. The method of claim 3 wherein the first subscriber and a third subscriber to the spam identification service are considered by the computing system to be related and separated by a second predetermined distance greater than the first predetermined distance if the third subscriber is listed in an electronic telephone contact book of the second subscriber.

5. The method of claim 2 wherein first and second subscribers to the spam identification service are considered by the computing system to be related and separated by a first predetermined distance in the social network graph if the first subscriber has accepted a request by the second subscriber to view a profile of the first subscriber in a social network.

6. The method of claim 2 wherein first and second subscribers to the spam identification service are considered by the computing system to be related and separated by a first predetermined distance in the social network graph if the first subscriber has called the second subscriber or sent a text message to the second subscriber during a particular time frame.

7. The method of claim 2 wherein determining a weight for each of the classifications is based on a number of relationships in the social network graph between the person associated with the second telephone number and the individual who submitted the classification.

8. The method of claim 7 wherein determining a weight for each of the classifications is also based on a strength of relationship between the person associated with the second telephone number and the individual who submitted the classification.

9. The method of claim 8 wherein the strength of relationship is based on a frequency of communications between the person associated with the second telephone number and the individual who submitted the classification.

10. The method of claim 2 wherein first and second subscribers to the spam identification service are considered by the computing system to be related and separated by a first predetermined distance in the social network graph only if there has been a reciprocal communication between the first and second subscribers.

11. A computer system for identifying that an incoming telephone call originating from a first telephone number and directed to a second telephone number is or potentially is from a source of telephone spam, the computer system comprising:
   a first data structure storing first information about a social network graph;
   a second data structure storing second information relating to previous calls from the first telephone number, wherein the second information includes classifications by individuals that are within a predetermined distance in the social network graph of a person associated with the second telephone number;
   a processor; and
   memory storing instructions that, if executed by the processor, cause the computer system to:
      access the plurality of classifications;
      determine a weight for at least some of the classifications that indicate that a previous call from the first telephone number was from a source of telephone spam, wherein a weight depends on a relative distance in the social network graph between an individual who submitted the classification and the person associated with the second telephone number;

combine the weights for at least some of the classifications that indicate that a previous call from the first telephone number was telephone spam;

determine whether the combined weights exceed a threshold;

determine whether the incoming telephone call is or potentially is from a source of telephone spam based on a result of determining whether the combined weights exceed a threshold; and cause an alert indicating that the incoming call is or potentially is from a source of telephone spam to be sent to a telephone associated with the second telephone number if it is determined that the incoming telephone call is or potentially is from a source of telephone spam.

12. The system of claim 11 wherein the social network graph represents relationships between subscribers to a spam identification service.

13. The system of claim 12 wherein at least some of the relationships represented in the social network graph are based on prior occurrence of e-mail communications between subscribers, telephone calls between subscribers, or text messages between subscribers.

14. The system of claim 12 wherein the weight for at least some of the classifications is based on a type of relationship between the individual who submitted the classification and the person associated with the second telephone number.

15. The system of claim 12 wherein the weight for at least some of the classifications is based on a frequency of interaction between the individual who submitted the classification and the person associated with the second telephone number.

16. The system of claim 15 wherein the frequency of interaction is based on a frequency of any combination of telephone calls, electronic text messages, voicemail messages and e-mail messages between the individual who submitted the classification and the person associated with the second telephone number.

17. A non-transitory computer-readable medium encoded with a computer program comprising instructions that, if executed, operate to cause the computer system to perform operations for indicating that an incoming telephone call originating from a first telephone number and directed to a second telephone number is or potentially is from a source of telephone spam, the operations comprising:

accessing a plurality of classifications by individuals that are within a predetermined distance in a social network graph of a person associated with the second telephone number;

determining a weight for at least some of the classifications that indicate that a previous call from the first telephone number was from a source of telephone spam, wherein a weight depends on a relative distance in the social network graph between an individual who submitted the classification and the person associated with the second telephone number;

combining the weights for at least some of the classifications that indicate that a previous call from the first telephone number was telephone spam;

determining whether the combined weights exceed a threshold;

determining whether the incoming telephone call is or potentially is from a source of telephone spam based on a result of determining whether the combined weights exceed a threshold; and causing an alert indicating that the incoming call is or potentially is from a source of telephone spam to be sent to a telephone associated with the second telephone number if it is determined that the incoming telephone call is or potentially is from a source of telephone spam.

18. The medium of claim 17 wherein the weight for at least some of the classifications is based on a type of relationship between the individual who submitted the classification and the person associated with the second telephone number.

19. The medium of claim 17 wherein the weight for at least some of the classifications is based on a frequency of interaction between the individual who submitted the classification and the person associated with the second telephone number.

20. The medium of claim 19 wherein the frequency of interaction is based on a frequency of any combination of telephone calls, electronic text messages, voicemail messages and e-mail messages between the individual who submitted the classification and the person associated with the second telephone number.

21. The medium of claim 17 wherein the weight for at least some of the classifications is based on frequency of communications between the person associated with the second telephone number and the individual who made the classification.

22. A computer system for identifying that an incoming telephone call originating from a first telephone number and directed to a second telephone number is or potentially is from a source of telephone spam, the computer system comprising:

a processor;

memory;

one or more data structures storing first information about a social network graph and storing second information relating to previous calls from the first telephone number, wherein the second information includes classifications by individuals that are within a predetermined distance in the social network graph of a person associated with the second telephone number;

a telephone spam determination unit operable to receive a request from a mobile telephone to determine if a calling number is or potentially is a source of telephone spam, wherein the telephone spam determination unit is operable in response to receiving the request to:

access the plurality of classifications;

determine a weight for at least some of the classifications that indicate that a previous call from the first telephone number was from a source of telephone spam, wherein the weight depends on a relative distance in the social network graph between an individual who submitted the classification and the person associated with the second telephone number;

combine the weights for at least some of the classifications that indicate that a previous call from the first telephone number was from a source of telephone spam and determine whether the combined weights exceed a threshold;

determine whether the incoming telephone call is or potentially is a source of telephone spam based on a result of determining whether the combined weights exceed a threshold; and cause an alert indicating that the incoming call is or potentially is a source of telephone spam to be sent to a telephone associated with the second telephone number if it is determined that the incoming telephone is or potentially is from a source of telephone spam.

23. The system of claim 22 wherein the telephone spam determination unit is operable to determine a weight for one of the classifications based on a number of relationships in the social network graph between the person associated with the second telephone number and the individual who submitted the classification.

24. The system of claim 22 wherein the telephone spam determination unit is operable to determine a weight for one of the classifications based on a strength of relationship between the person associated with the second telephone number and the individual who submitted the classification.

25. The system of claim 24 wherein the strength of relationship is based on a frequency of communications between the person associated with the second telephone number and the individual who submitted the classification.

26. The system of claim 22 wherein first and second subscribers to the spam identification service are considered by the telephone spam determination unit to be related and separated by a first predetermined distance in the social network graph only if there has been a reciprocal communication between the first and second subscribers.

* * * * *